(12) United States Patent
Meredith et al.

(10) Patent No.: US 9,736,644 B2
(45) Date of Patent: Aug. 15, 2017

(54) SYSTEMS, METHODS, AND COMPUTER-READABLE STORAGE DEVICES FOR GENERATING AND USING A RADIO-FREQUENCY MAP OF AN AREA

(71) Applicant: AT&T Mobility II LLC, Atlanta, GA (US)

(72) Inventors: Sheldon Kent Meredith, Marietta, GA (US); Jeremy Fix, Acworth, GA (US); Mario Kosseifi, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/193,455

(22) Filed: Jun. 27, 2016

(65) Prior Publication Data
US 2016/0309297 A1    Oct. 20, 2016

Related U.S. Application Data

(63) Continuation of application No. 14/097,891, filed on Dec. 5, 2013, now Pat. No. 9,380,425.

(51) Int. Cl.
| | |
|---|---|
| *H04W 24/00* | (2009.01) |
| *H04W 4/02* | (2009.01) |
| *H04L 29/08* | (2006.01) |
| *H04W 4/00* | (2009.01) |
| *H04W 4/04* | (2009.01) |

(52) U.S. Cl.
CPC ............ *H04W 4/023* (2013.01); *H04L 67/22* (2013.01); *H04W 4/008* (2013.01); *H04W 4/04* (2013.01)

(58) Field of Classification Search
USPC ............... 455/456.1, 456.5, 422; 370/252
See application file for complete search history.

(56) References Cited

U.S. PATENT DOCUMENTS

| | | | |
|---|---|---|---|
| 6,009,359 | A  | 12/1999 | El-Hakim et al. |
| 6,292,106 | B1 | 9/2001  | Solinsky et al. |
| 6,446,031 | B1 | 9/2002  | Welch et al. |
| 7,302,369 | B2 | 11/2007 | Wren |
| 7,359,718 | B2 | 4/2008  | Tao et al. |

(Continued)

FOREIGN PATENT DOCUMENTS

| | | |
|---|---|---|
| EP | 2472226    | 7/2012 |
| WO | 2013038005 | 3/2013 |

OTHER PUBLICATIONS

Chen et al. "FM-based Indoor Localization", Proceedings 10th Intl. Conf. on Mobile Systems, Applications, and Services, Jun. 25-29, 2012, 13 pp (2012).

(Continued)

*Primary Examiner* — David Q Nguyen
(74) *Attorney, Agent, or Firm* — Hartman & Citrin LLC

(57) ABSTRACT

A method comprising obtaining, by a system using a processor, a wireless fingerprint corresponding to a mobile communication device and a subject area in which the mobile communication device is or was positioned. The method also includes obtaining, by the system, an area wireless signal distribution map indicating wireless signal strength values corresponding to multiple wireless transmitters positioned in the subject area, and determining, by the system, based on the wireless fingerprint and the area wireless signal distribution map, a location of the mobile communication device.

20 Claims, 7 Drawing Sheets

(56) References Cited

U.S. PATENT DOCUMENTS

| | | | |
|---|---|---|---|
| 7,389,207 B2 | 6/2008 | Saitta | |
| 7,893,874 B2 | 2/2011 | Chung et al. | |
| 7,898,977 B2 | 3/2011 | Roese et al. | |
| 8,204,512 B2 | 6/2012 | Dietrich et al. | |
| 8,320,939 B1 | 11/2012 | Vincent | |
| 8,326,465 B2 | 12/2012 | Rosca et al. | |
| 8,395,968 B2 | 3/2013 | Vartanian et al. | |
| 8,504,288 B2 | 8/2013 | Kadous et al. | |
| 8,825,388 B2* | 9/2014 | Khorashadi | G01C 21/206 701/26 |
| 9,037,131 B2* | 5/2015 | Park | H04W 16/20 455/422.1 |
| 2006/0221769 A1 | 10/2006 | Van Loenen et al. | |
| 2007/0082677 A1 | 4/2007 | Donald Hart et al. | |
| 2010/0090899 A1 | 4/2010 | Zhao et al. | |
| 2011/0191465 A1 | 8/2011 | Hofstaedter et al. | |
| 2012/0130632 A1 | 5/2012 | Bandyopadhyay et al. | |
| 2012/0166437 A1 | 6/2012 | Esteve Balducci et al. | |
| 2012/0169530 A1 | 7/2012 | Padmanabhan et al. | |
| 2012/0195491 A1 | 8/2012 | Zhang et al. | |
| 2013/0107728 A1 | 5/2013 | Zhu et al. | |
| 2013/0122941 A1* | 5/2013 | Das | H04W 4/04 455/456.5 |
| 2013/0138336 A1 | 5/2013 | Zaid et al. | |
| 2013/0225209 A1 | 8/2013 | Chen et al. | |
| 2013/0226451 A1 | 8/2013 | O'Neill et al. | |
| 2013/0281111 A1 | 10/2013 | Syrjarinne et al. | |
| 2015/0156611 A1 | 6/2015 | Aggarwal et al. | |

OTHER PUBLICATIONS

Guo et al. "2.5D Indoor Mapping and Location-Sensing Using an Impulse Radio Network", School of Computer Science, The University of Manchester, 5 pp (2005).

Hightower et al. "SpotON: An Indoor 3D Location Sensing Technology Based on Rf Signal Strength", UW CSE Technical Report, 16 pp (Feb. 18, 2000).

Pahlavan et al. Wideband Radio Propagation Modeling for Indoor Geolocation Applications, Communications Magazine, IEEE 36.4, pp. 60-65 (Apr. 1998).

Mitilineos el al., "Indoor Localization With Wireless Sensor Networks", Progress in Electromagnetics Research 109:441-474 (2010).

U.S. Office Action dated Sep. 21, 2015 in U.S. Appl. No. 14/097,891.

U.S. Notice of Allowance dated Feb. 16, 2016 in U.S. Appl. No. 14/097,891.

* cited by examiner

SYSTEMS, METHODS, AND COMPUTER-READABLE STORAGE DEVICES FOR GENERATING AND USING A RADIO-FREQUENCY MAP OF AN AREA

CROSS-REFERENCE TO RELATED APPLICATIONS

This application is a continuation of and claims priority to U.S. patent application Ser. No. 14/097,891 filed Dec. 5, 2013, now U.S. Pat. No. 9,380,425, which is incorporated herein by reference in its entirety.

TECHNICAL FIELD

The present disclosure relates generally to software for mapping an area using radio-frequency transmitters and receivers and, more particularly, to systems, methods, and computer-readable storage devices for generating and using a radio-frequency map of an area.

BACKGROUND

Data indicating locations of mobile devices, or travel paths taken regularly by mobile devices, is becoming increasingly valuable in a wide variety of industries.

Locations and paths of mobile devices moving outdoors can be determined in a variety of known ways including using a satellite navigation system, such as the Global Positioning System. Other techniques include triangulation using cellular base stations for locating mobile devices positioned between the stations.

In many areas, though, such as indoors, mobile device's satellite and/or cellular coverage is insufficient. This makes determining device location using conventional techniques difficult or impossible. In many cases, radio-frequency reception outdoors is also limited.

Even when long-distance locating methods such as triangulation are available, they are sometimes less preferred for reasons including undesirably-low accuracy.

Industries interested in mobile-device location and travel path data include the wireless communications industry. A wireless communications service provider could use the information to, for instance, improve selection, locating, orientation, and application (e.g., allocated bandwidth) of access points. Example wireless communications service providers include providers of cellular communication channels and operators of proprietary local networks such as an enterprise.

Other groups interested in knowing locations and travel paths of mobile devices include major retailers, and other advertising entities. Managers of other destinations such as museums, airports, restaurants, public parks, or any operator of an indoor or outdoor space or area would also benefit from a better understanding of patterns of customer movement.

Providers of wireless communication channels also benefit from knowing accurate locations and dimensions of physical structures proximate their transceivers, such as buildings, walls, furniture, buildings, billboards, or any potential impediment to wireless communication. Locating outdoors structures can be facilitated using satellite imagery. Still, identifying, and determining dimensions (e.g., height and width) and location accurately of many outside structures, such as billboards, external walls, etc., typically require additional reference information such as on-the-ground radar data. Locations, orientations, and dimensions of indoor structures, such as hallways and doorways, like indoor mobile device movement, cannot be determined reliably using satellite systems, or accurately using long-distance wireless signals.

Location, orientations, and dimensions of indoor structures are useful to other industries, beyond providers of wireless communication channels, as well. Emergency service providers such as police, EMS, and firefighters, e.g., benefit tremendously from having access to interior maps of a building in which there is an emergency. Emergency personnel can review a digital map of a building interior on a mobile device while en route to an incident and while onsite.

As another example, work of home or commercial construction contractors could be facilitated by accurate interior mapping. They can save time and cost, for instance, working from properly-formatted mapping data in preparing to remodel a building, for instance, by not having to, e.g., create a virtual mock-up on their own.

Still other users of accurate indoor map data include interior decorators and owners of property, governmental or private, such as shopping malls or office space. Custom government or enterprise software packages can incorporate accurate interior map data in a variety of ways.

In addition to the shortcomings described above for determining location and travel paths and generating interior maps, efforts available to date require excessive infrastructure in order to attain even a decent level of accuracy. Many also require use of a pre-existing base map of the area. And most locating and path-determining techniques are laborious and time-consuming. In one example, personnel resort to expensive walk-testing of buildings to document building interior layouts.

Moreover, layout of many areas, such as building interiors, are usually subject to change over time. For instance, cubicle walls or even hard walls get moved, new hallways or offices are created, etc. Typically, a relatively large investment of time and cost (e.g., cost of measuring hardware and software packages) is required for again determining new layout data, using conventional techniques, when the latest determinations become outdated.

SUMMARY

The present disclosure relates to a method comprising obtaining, by a system using a processor, a wireless fingerprint corresponding to a mobile communication device and a subject area in which the mobile communication device is or was positioned. The method also includes obtaining, by the system, an area wireless signal distribution map indicating wireless signal strength values corresponding to multiple wireless transmitters positioned in the subject area, and determining, by the system, based on the wireless fingerprint and the area wireless signal distribution map, a location of the mobile communication device.

In one aspect the method also includes generating the area wireless signal distribution map based on wireless signal strength data received from numerous wireless devices moving or having moved in the subject area.

In another aspect the wireless fingerprint comprises multiple components of wireless signal strength data in association with identification of at least two of the wireless transmitters positioned in the subject area.

In an aspect, the mentioned operation of obtaining the wireless fingerprint includes receiving, from the mobile device, a message comprising the wireless fingerprint.

In one aspect, the mentioned operation of obtaining the area wireless signal distribution map comprises retrieving the area wireless signal distribution map from a memory of a server being remote to the mobile device.

In another aspect, the mentioned operation of determining the location of the mobile communication device comprises determining a geographic location of the mobile communication device.

In one aspect, the location of the mobile communication device is provided in terms of distance from or coordinates with respect to at least one reference point of the subject area.

In another aspect, the location of the mobile communication device is provided in terms of distance from or coordinates with respect to at least one of the wireless transmitters in the subject area.

In one aspect, the mobile communication device is unable to receive satellite positioning signals while the mobile communication device is positioned in the subject area.

In another aspect, the present disclosure relates to a computer-readable medium comprising computer-executable instructions that, when executed by the processor, cause the processor to perform operations comprising any of the method functions and related features described in the preceding paragraphs of this Summary.

In another aspect, the present disclosure relates to a system comprising a processor and a computer-readable medium like that described in the preceding paragraph of this Summary.

Other aspects of the present disclosure will be in part apparent and in part pointed out hereinafter.

DETAILED DESCRIPTION

Figure 1:
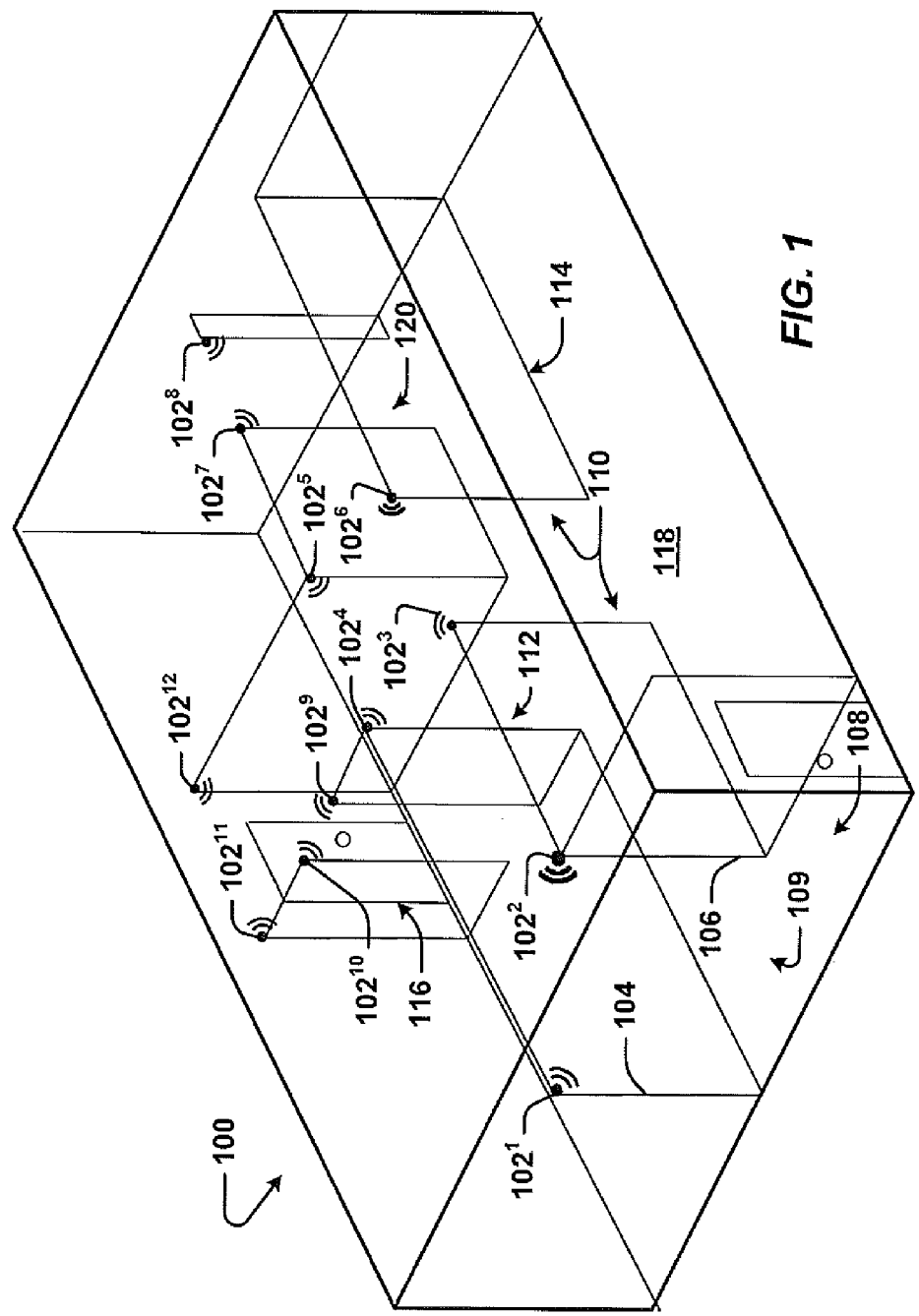
FIG. 1 illustrates an example environment in which the technology set forth by the present disclosure can be used.

As required, detailed embodiments of the present disclosure are disclosed herein. The disclosed embodiments are merely examples that may be embodied in various and alternative forms, and combinations thereof.

The figures are not necessarily to scale and some features may be exaggerated or minimized, such as to show details of particular components. In some instances, well-known components, systems, materials or methods have not been described in detail in order to avoid obscuring the present disclosure.

Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software.

The term application, or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. Processing structures and arrangements are described more below.

I. Overview of the Disclosure

In various embodiments, the present disclosure describes systems and methods for generating, at a server or other computer, a wireless, or radio-frequency, map of an area. The system and methods disclosed also include those configured for using such a map. An example use is determining a location of a mobile communication device based on the wireless map generated.

The map is generated with high-accuracy using a crowdsourcing technique. In the technique, signal strength data from numerous mobile devices, e.g., wireless communication devices, is collected and analyzed to generate the map.

An example area is an interior of a building. The technology is not limited to interior applications, though the present technology is at times described herein primarily in connection with an interior context. The technology may be used, for instance, to generate a radio-frequency (RF) map of an outdoors area, such as a streetscape, a boardwalk or beach area, an amusement park, a public park, etc.

Teachings presented herein with a focus on intra-structure scenarios are, thus, to be construed as equally applicable in an analogous manner to outdoor scenarios.

As an example, determining an outdoor-area RF map can be determined as may be described in more detail regarding determining an indoor-area RF map. And determining locations, orientations, and sizes of exterior structures, such as exterior building walls, or steps down to a subway station, can be determined in manners like those described herein for determining locations, orientations, and sizes of interior walls or interior staircases.

One or more wireless transmitters (e.g., transceivers), such as WI-FI® or other access points and/or BLUETOOTH® beacon(s), are positioned at locations within the area being analyzed. (WI-FI is a registered trademark of WI-FI Alliance, of Austin, Tex.; BLUETOOTH is a registered trademark of Bluetooth SIG, Inc., of Bellevue, Wash.)

Information used in generating the RF map includes values for strength of wireless signals received from intra-area transmitters by multiple mobile communication devices moving within the area.

In some embodiments, one or more of the transmitters are positioned preferably at turns within the area being analyzed, or locations where people tend to change directions, slow down, or stop. Example positions include on a wall at a corner where two or more hallways meet, and on walls or door frames adjacent entrances, such as an entrance to a building, conference rooms, offices, staircases, mall stores, grocery stores, parks, amusement park rides, etc.

The transmitters can be provided as a permanent or temporary installation. In addition to using transmitter installations to generate an RF map, a benefit of leaving the transmitters installed is allowing an operator to determine locations of subject mobile devices moving in the area using the generated RF map and RF fingerprints generated at the subject mobile devices based on signals from the same transmitters. An RF fingerprint includes, e.g., a data structure comprising values for strength of wireless signals received from one or more transmitters in the subject area, and can include other data such as identification of the transmitter(s) from which signals being received at the mobile device and at least one time stamp.

Another benefit to a longer-term installation is that revisions or updates to the RF map, or related maps (e.g., RF/geographical layout or architectural map) can be more easily made. These may be needed to accommodate reconfigurations to the area, such as due to walls or cubicles being moved, staircases or elevators being added or removed, etc.

There are benefits to shorter-term, or temporary, transmitter installations as well. These benefits include cost savings, such as from avoiding investment in possibly more-expensive installation hardware and labor, and maintenance, which may be needed to implement longer-term installations. Cost savings in some implementations also result from an ability to reuse hardware, including the transmitters and possibly mounting wares, subsequently for mapping other areas.

Each of multiple subject mobile devices, used in the process of generating the RF map, is programmed with a custom software application. Using the application, the device determines strength of signals, i.e., downlink signal strength, of wireless signals received at the device from the strategically located transmitters.

The custom application is in some embodiments installed temporarily to mobile devices. In contemplated embodiments, device software is configured to initiate un-installation of itself. The uninstall may be initiated and/or performed by the software itself or by another program of the mobile device. The uninstall may be performed automatically following a triggering event, such as a set period of time lapsing. Example time periods include one week, one month, and one year.

In another contemplated embodiment, the software is configured to initiate un-installation of itself automatically following a triggering event, such as receipt of an instruction received by user input or remote message.

Another example triggering event is a determination that functions of the process performed at the mobile device (e.g., sensing signal values and sending them to a remote server with time stamp, mobile-device orientation, and/or transmitter data) has been completed. Another example triggering event is receipt at the mobile device of an uninstall instruction from the remote server or such as a user instruction from a user of the device.

As with the benefits of installing the transmitters for longer or shorter periods of time, benefits to keeping the custom software installed at mobile devices for a longer period of time include the arrangement being operable straight away, at a subsequent time, without need to reinstall the software at the mobile devices. The subsequent use may be to, e.g., generate revisions or updates to the radio-frequency map generated.

Benefits to shorter-term software presence at the mobile devices include freeing memory and function of the mobile devices sooner by removing the software, such as immediately after the process, or the at-device functions, being completed.

Data generated and/or collected at the mobile devices can include data ancillary to the primary signal strength data. Ancillary data can include, for instance, time stamps indicating any of when each signal is sent, when each signal is received, and when signal-strength measurement is made.

Ancillary data can also include identifications specific to the transmitters from which corresponding signals being measured were received. The ancillary data can also include device-orientation data indicating an orientation that the device was at when it made a corresponding signal strength measurement.

Most functions described herein as being performed at the mobile device can be performed instead at a remote server or other computer, and vice versa.

In one embodiment, an application, of a remote server, is configured to cause a computing processor of each server to determine, based on signal strengths measured at mobile devices, positional measurements of the mobile devices with respect to signal-providing transmitters. The application is configured to recognize, e.g., that as signals received at a mobile device from a particular transmitter are ramping up, or increasing, the mobile device is moving toward the particular transceiver. The application further correlates an instance of strengths from the particular transmitter changing more slowly, or temporarily remaining generally unchanged for a short period of time, with the mobile device being adjacent the particular transmitter. The application could also be configured to determine an adjacent-transmitter condition when signal strengths measured correspond to a maximum strength output by the particular transmitter. And the application causes the server to determine that, as signal strengths then begin to decrease, the mobile device has begun moving away from the transmitter.

In one embodiment, the application is configured to process mobile device movement data, such as orientation or speed, along with time data, for determining inter-transmitter spacing or distances. The application is similarly configured to process the mobile device movement data, such as orientation or speed, along with time data, for determining path data describing mobile device movement with respect to the transmitters.

In still another embodiment, the application is configured to process RF map data and one or more pieces of geographical data, such as global coordinates of one or more structures in the subject area, such as a latitude/longitude coordinates corresponding to an entrance to an area. The application generates an RF/geographic map using the information, identifying geographic locations of structures within an area and/or for identifying geographic locations corresponding to any wireless fingerprint in the area.

Ancillary data considered in generating walking paths or densities or maps (e.g., RF map, RF/geo map, or architectural map) can also include mobile-device-related kinematic information beyond orientation, such as an average walking speed or pace and/or an actual, device-specific, device speed or pace, or an average or actual velocity.

For use in determining some actual, device-specific kinematic characteristics, the mobile device can include at least one orientation sensor, such as a tri-axial accelerometer. The same and/or another sensor component of the mobile device, such as a pedometer, can be used to measure characteristics related to motion (e.g., linear displacement, linear speed, and/or linear acceleration).

II. Example Interior Environment—FIG. 1

Now turning to the figures, and more particularly to the first figure, FIG. 1 illustrates an example subject area 100. The example area 100 is in the form of a building interior 100.

One or more wireless transmitters 102 are positioned at strategic locations within the building 100. Example transmitters 102 include WI-FI® or other access points and BLUETOOTH® or other beacons. While the term transmitter is used primarily herein to describe the component 102, transceivers can be used.

The number of transmitters 102 is not limited. It should be appreciated that, generally, accuracy of the computerized determinations of the present technology are made more accurate when more transmitters are used. The number of transmitters 102 may be, e.g., 2, 5, 10, 20, 50, 100, 1,000, 10,000, or any number between these or above.

As noted, any of the transmitters (or transceivers, access points, or beacons) can be provided as permanent or temporary installations. Benefits for shorter-term installations and benefits to longer term installations are described above. The benefits of installing the transmitters for longer periods of time include an ability to at subsequent times be used in connection with determining locations of mobile devices moving in the subject area 100. Another benefit to a longer-term installation is that the arrangement can operate for generating any revisions or updates needed for, e.g., a revised architectural map, based on reconfiguration of the subject area, such as due to walls, staircases, cubicles, or furniture being added, removed, or moved, etc.

Continuing with the example of FIG. 1, twelve transmitters $102^1$-$102^{12}$ are positioned at select locations within the area 100. In one embodiment, the locations include at least one transition point, e.g., a place where people would typically change directions, slow, or stop. Example transition points include corners, such as corners 104, 106, entries or exits to staircases, entries or exits to offices, such as office 120, or conference rooms, such as conference room 118, or entrances or exits to the building 100 or a hallway 108, 110, 112 thereof. Each of the transmitters 102 shown in FIG. 1 is located selectively in this way.

A first transmitter $102^1$ of the group is positioned at an outside corner 104 of the interior of the building 100. A height of the transmitter during installation can be selected as that expected to best facilitate communication with the participating mobile devices passing through the building 100. An example mobile device is described in more detail below, in connection with FIG. 3, which shows the device schematically.

Further regarding positioning of the transmitters 102, a preferred height of positioning is in some cases a relatively high point in the vicinity, such as at a top of the transition point, e.g., top of a corner 104, 106.

A second transmitter $102^2$ of the group is positioned at an inside corner 106 of the building 100. Positioning of transmitters 102 is described more below in connection with the method of FIG. 4.

Each of the participating mobile devices is programmed with a custom software package or application. The software application includes computer-executable instructions, or code, that, when executed by a processor of the wireless communication device, causes a computing processor of the mobile device to perform operations including processing strengths or levels of wireless signals received at the mobile device from proximate transmitters 102.

Functions of the mobile device, executing the code, can include any one or more of a variety of functions, such as storing, or at least caching, the determined strength values to a storage medium, such as a memory of the mobile device.

In one embodiment, the mobile-device functions include collecting or generating information corresponding to each signal strength measurement. The processing can include, e.g., generating and storing a respective time value associated with each of the wireless-signal strength measurements. Each time, being associated with a corresponding signal strength value, can be referred to as a time stamp and indicates when the corresponding signal was sent, or when received, or when the signal strength value was determined.

In one embodiment, the mobile-device functions include, with respect to each wireless signal received and for which strength is measured at the mobile device, receiving and storing or caching data identifying the transmitter from which the wireless signal was received. In addition to the mobile device, executing the code, determining strength of signals received from the first two transmitters introduced above, $102^1$ and $102^2$, for example, the device also associates each of the measured signal values with a respective transmitter $102^1$, $102^2$ from which the signals measured were received.

In one embodiment, an indication of transmitter identification is provided in the signals being received from each transmitter 102.

The code can be further configured to package data related to a wireless signal strength measurement. The resulting data structure can be referred to as a data packet, a data package, a data set, or the like. Data sets can be stored or cached at the device in any of a wide variety of formats, including as distinct data sets or as a broader data structure comprising data that could be provided by data sets. The broader data structure could be arranged in, e.g., columns or rows of a table or matrix.

As an example, related pieces of data, such as a time stamp, a receiving mobile-device orientation, and a transmitter identification associated with a signal and measured strength of the signal, can be associated in a data structure.

In another contemplated embodiment, each data structure is dedicated to one or more characteristics, such as to a particular transmitter or transmitters 102 and/or to a specific time or time span.

As referenced, functions of the present technology, described in more detail below (e.g., in connection with FIG. 4), include generating a radio-frequency (RF) map. The RF map can referred to by other names, such as wireless map, wireless profile, area RF profile, RF profile map, a wireless area profile, the like, or other.

Another referenced function of the present technology, also described in more detail below (e.g., in connection with FIG. 4) is generating a radio-frequency/geographic map.

Still another referenced function of the present technology, also described in more detail below (e.g., in connection with FIG. 5) is determining a location of a mobile device positioned in the area 100.

Still another referenced function of the present technology, also described in more detail below (e.g., in connection with FIG. 6) is determining a geographic location of a subject mobile device using feedback from the subject device and the wireless/geo map.

Still another referenced function of the present technology, also described in more detail below (e.g., in connection with FIG. 7) is generating an architecture map and/or a walking path map. The architectural map can be referred to by other names and need not include entirely, or at all, what may be considered by some to be architectural features. Features can include, depending on the area (e.g., areas including indoor and/or outdoor portions), billboards, bus stop stands, trees, hills, cliffs, fencing, other barriers, man-made or natural, the like, and other. Other names for this map include, e.g., an architectural layout, a structural map or layout, a layout, an area layout, a layout map, an area layout map, the like, or other.

III. Remote Server—FIG. 2

Figure 2:
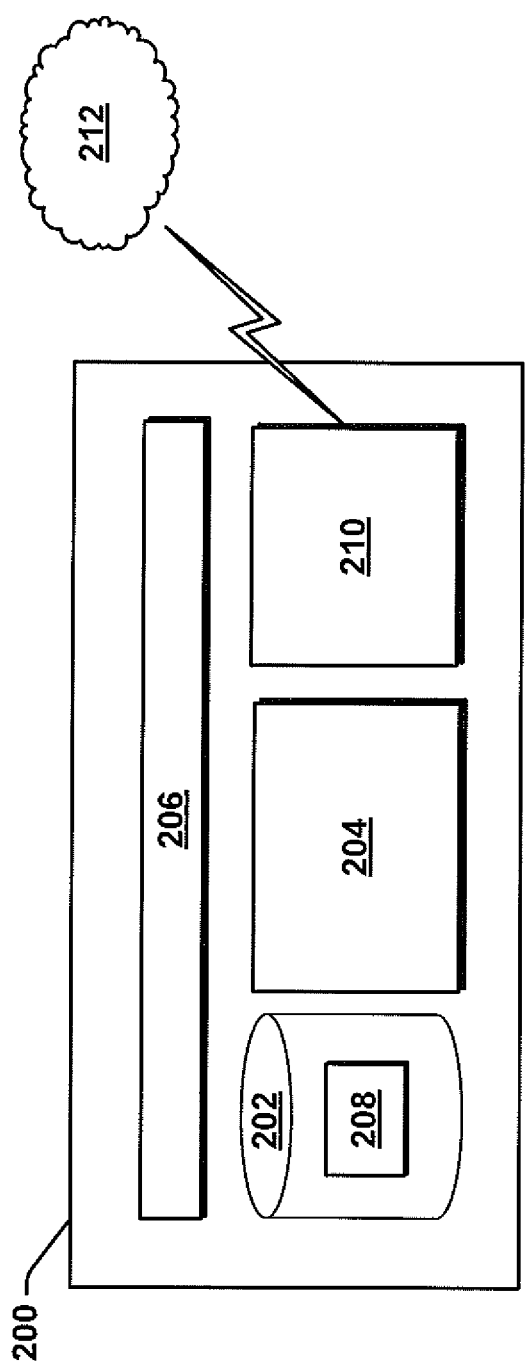
FIG. 2 illustrates a computer system, and components thereof, for performing operations of the present technology.

With continued reference to the figures, FIG. 2 shows an example computing system 200 for use in performing some of the functions of the present technology. The system 200 may be implemented as a personal computer, a laptop, a tablet, or even a smart phone, for instance.

Regarding terminology, the system 200 may be referred to as a mapping system. The system 200 can also be identified as a server, and may be referred to as a mapping server 200. Considering also the locating functions described herein (e.g., with respect to the method 500 of FIG. 5), the system 200 may be referred to as a mapping-and-locating system, device, or server 200. The naming convention used herein does not limit operations of the system, device, or server, e.g., does limit system operations to what might be considered as strictly mapping and/or locating operations. Rather the system 200 can be used to perform any of the computing functions herein, while referred to the system 200 as a mapping and/or a locating system, device, or server 200.

Because the system 200 is in most embodiments remote to at least one mobile device providing signal-measurement data, the system 200 may be referred to as a remote system, device, or server 200.

Although connections are not shown between all of the components illustrated in FIG. 2, the components can interact with each other to carry out server functions.

As shown, the mapping server 200 includes a memory, or computer-readable medium 202, such as volatile medium, non-volatile medium, removable medium, and non-removable medium. The term computer-readable media and variants thereof, as used in the specification and claims, refer to tangible or non-transitory media, i.e., computer-readable storage devices.

In some embodiments, storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices, excluding propagating signals.

The mapping server 200 also includes a computer processor 204 connected or connectable to the computer-readable medium 202 by way of a communication link 206, such as a computer bus.

The processor 204 could be multiple processors, which could include distributed processors or parallel processors in a single machine or multiple machines. The processor 204 can be used in supporting a virtual processing environment. The processor 204 could include a state machine, application specific integrated circuit (ASIC), programmable gate array (PGA) including a Field PGA, or state machine. References herein to a processor 204 executing code or instructions to perform operations, acts, tasks, functions, steps, or the like, could include the processor 204 performing the operations directly and/or facilitating, directing, or cooperating with another device or component to perform the operations.

The computer-readable medium 202 includes computer-executable instructions 208, which may be referred to as code, a program, or a software application. The computer-executable instructions 208, when executed by the processor 204, cause the processor 204, and thus the mapping server 200, to perform any combination of the functions described in the present disclosure.

The mapping server 200 further comprises an input/output (I/O) device 210, such as a wireless transmitter and/or a wired communication port. The processor 204, executing the instructions 208, sends and receives information, such as in the form of messages or packetized data, to and from one or more communication networks 212, such as the internet and/or an intranet.

The mobile devices can send data for receipt by the server, or mapping server 200, in any of a wide variety of formats and by way of any of a wide variety of communication channels. The data can be sent by one or more messages via internet-based or other e-mail. The transmission can be made via wired and/or wireless networks, such as using a cellular network.

The present technology beneficially can be implemented using communication channels of any wireless communications service provider, including any cellular or other long-range service provider, and any provider of short or medium-range wireless communications, on a worldwide basis.

As referenced above and described more below, the data may be transmitted in packets, within one or more transmissions or messages, and in any format, such as in tabular or chart form.

Other functions related to the mapping server 200 are described more below, including in connection with FIGS. 4-7.

IV. Example Mobile Device—FIG. 3

Figure 3:
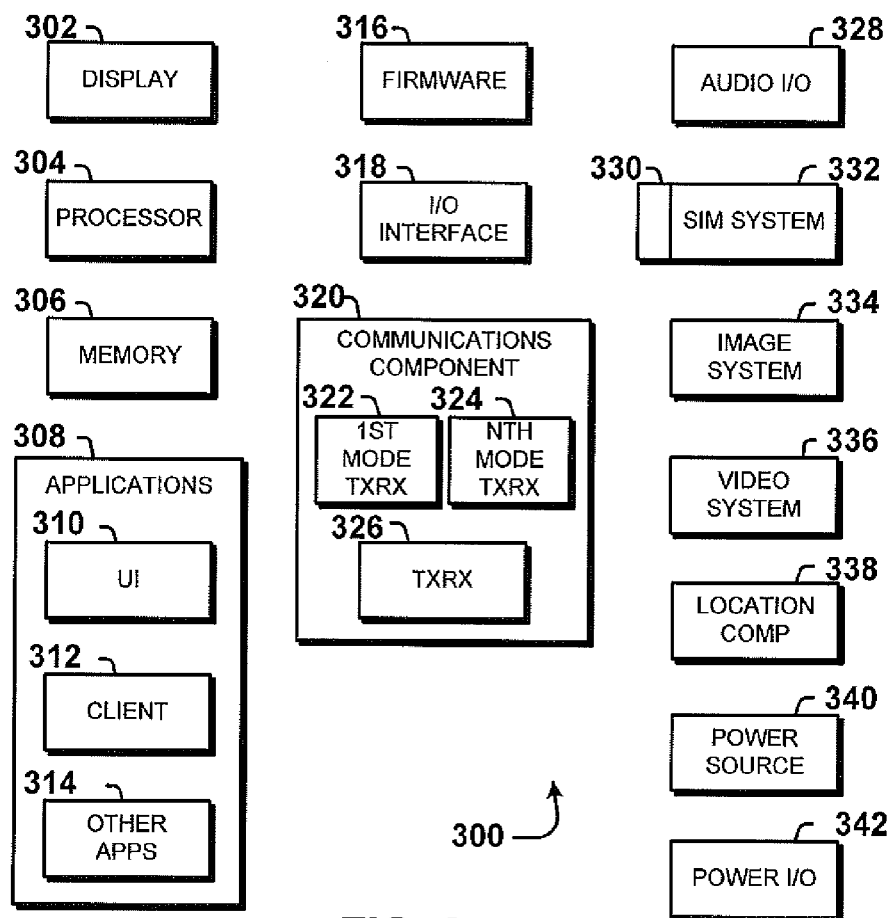
FIG. 3 illustrates a mobile device, and components thereof, for performing other operations of the present technology.

FIG. 3 shows an example of a wireless, mobile device 300 for use in accordance with embodiments of the present disclosure. The mobile device 300 may include a smart phone, tablet, or navigation-focused device, for instance.

Although all connections between components are not shown in FIG. 3, the components interact with each other as needed to carry out device functions. In some embodiments, for example, the components are arranged so as to communicate via one or more busses (not shown). It should be understood that FIG. 3 and the following description are intended to provide a general understanding of a suitable environment in which some aspects of some embodiments of the present technology can be implemented.

In some embodiments, the mobile device 300 is a multi-mode headset and has a variety of computer readable media, including, for example, volatile media, non-volatile media, removable media, and non-removable media. The term computer-readable media and variants thereof, as used in the specification and claims, refer to storage devices. In some embodiments, storage media includes volatile and/or non-volatile, removable, and/or non-removable media. For example, storage media includes random access memory (RAM), read-only memory (ROM), electrically erasable programmable read-only memory (EEPROM), solid state memory or other memory technology, CD ROM, DVD, or other optical disk storage, magnetic tape, magnetic disk storage or other magnetic storage devices, or any other medium that can be used to store the desired information, excluding propagating signals, and that can be accessed by the mobile device 300.

As illustrated in FIG. 3, the mobile device 300 includes a display 302 for displaying multimedia such as, for example, application graphical user interfaces (GUIs), text, images, video, telephony functions such as Caller ID data, setup functions, menus, music, metadata, messages, wallpaper, graphics, Internet content, device status, preferences settings, map and location data, routes and other directions, points of interest (POI), and the like.

The illustrated mobile device 300 also includes a processor 304 for controlling, processing data, and/or executing computer-executable instructions of one or more applications, and a memory 306 for storing data and/or one or more applications 308.

As with the earlier-described processor, this processor 304 could be multiple processors, which could include distributed processors or parallel processors in a single machine or multiple machines. The processor 304 can be used in supporting a virtual processing environment. The processor 304 could include a state machine, application specific integrated circuit (ASIC), programmable gate array (PGA) including a Field PGA, or state machine. References herein to a processor 304 executing code or instructions to perform operations, acts, tasks, functions, steps, or the like, could include the processor 304 performing the operations directly and/or facilitating, directing, or cooperating with another device or component to perform the operations.

In some embodiments, the memory 306 stores instructions or code, which may be embodied in a custom software package or application, associated with some of the functions described herein, including receiving radio-frequency signals from various transmitters 102, processing the signals, including analyzing signal strength or level thereof, packaging signal data, e.g., along with time-stamp and transmitter-identification information, and sending the package to the remote server 200 for generation of an RF map, an RF/geo map, a traffic or movement map, and/or an architectural map, and for determining locations of wireless devices using the RF map, according the methods described herein. The memory 306 may also store information including user preference factors and/or administrative factors set by an administrator, manufacturer, or service provider.

In some embodiments, the application(s) 308 include a user interface (UI) application 310. The UI application 310 interfaces with a client 312 (e.g., an operating system (OS)) to facilitate user interaction with device functionality and data. In some embodiments, the client 312 is one of Symbian OS® (Symbian OS is a registered trademark of Symbian Limited, of London, England), Microsoft® Windows® Mobile OS (Microsoft and Windows are registered trademarks of the Microsoft Corporation of Redmond, Wash.), Palm webOS® (Palm WebOS is a registered trademark of the Palm Trademark Holding Company, of Sunnyvale, Calif.), Palm OS® (also a registered trademark of the Palm Trademark Holding Company), RIM® BlackBerry® OS (RIM and Blackberry are registered trademarks of Research In Motion Limited of Waterloo, Ontario, Canada), Apple® iPhone® OS (Apple and iPhone are registered trademarks of the Apple Corporation, of Cupertino, Calif.), or Google Android® OS (Android is a registered trademark of Google, Inc., of Mountain View, Calif.). These operating systems are merely examples of the operating systems that can be used in accordance with the embodiments disclosed herein. Other operating systems are contemplated.

The UI application 310 aids the user in entering message content, viewing received messages, answering/initiating calls, entering/deleting data, entering and setting user IDs and passwords, configuring settings, manipulating address book content and/or settings, interacting with other applications 314, and the like.

The other application 314 comprises, at least temporarily, the custom software mentioned above. The software, when executed by the processor 304 causes the device to perform the functions described, including collecting and analyzing strength of wireless signals received from the transmitters 102.

The functions can also include, as noted above and described further below in connection with the methods of FIG. 4-6, processing messages received from mobile devices 300, such as messages having packaged therein signal data coupled with time-stamp and transmitter identification information, and using the same to generate an RF map, an RF/geo map, a traffic or movement map, and/or an architectural map, and for determining locations of wireless devices using the RF map, according the methods described herein.

In some embodiments, the other applications 314 also include, for example, add-ons, plug-ins, location applications, e-mail applications, music applications, video applications, camera applications, power conservation applications, game applications, productivity applications, entertainment applications, enterprise applications, customer information management applications, accounting applications, authentication applications, applications, proprietary business applications, combinations thereof, and the like. The applications 308 are stored in the memory 306 and/or in a firmware 316, and can be executed by the processor 304. The firmware 316 can also store code for execution during device 300 power up, for example.

The illustrated mobile device 300 also includes an input/output (I/O) interface 318 for input/output of data, such as, for example, user IDs, passwords, and application initiation (start-up) requests. In some embodiments, the I/O interface 318 is a hardwire connection, such as, for example, a USB, mini-USB, audio jack, PS2, IEEE 1394, serial, parallel, Ethernet (RJ48) port, RJ11 port, or the like. In some embodiments, the I/O interface 318 accepts other I/O devices such as, for example, keyboards, keypads, mice, interface tethers, stylus pens, printers, thumb drives, touch screens, multi-touch screens, touch pads, trackballs, joysticks, microphones, remote control devices, monitors, displays, liquid crystal displays (LCDs), combinations thereof, and the like. It should be appreciated that the I/O interface 318 can be used for communications between the mobile device 300 and a network or local device, instead of, or in addition to, a communications component 320.

The communications component 320 interfaces with the processor 304 to facilitate wired/wireless communications with external systems. Example external systems include, but are not limited to, intranets, network databases, network storage systems, cellular networks, location systems, Voice over Internet Protocol (VoIP) networks, local area networks (LANs), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component 320 includes a multimode communications subsystem for providing cellular communications via different cellular technologies. In some embodiments, for example, a first cellular transceiver 322 operates in one mode, such as, Global System for Mobile communications (GSM), and an $N^{th}$ cellular transceiver 324 operates in a different mode, such as Universal Mobile Telecommunications System (UMTS). While only two cellular transceivers 322, 324 are illustrated, the mobile device 300 may include more than two transceivers.

The illustrated communications component 320 also includes a transceiver 326 for use by other communications technologies such as, for example, WIFI, WIMAX, BLUETOOTH, infrared, infrared data association (IRDA), near field communications (NFC), RF, and the like. In some embodiments, the communications component 320 also facilitates reception from terrestrial radio networks, digital satellite radio networks, internet-based radio services networks, combinations thereof, and the like. The communications component 320 can process data from a network such as, for example, the internet, an intranet, a home broadband network, a WIFI hotspot, and the like, via an ISP, DSL provider, or broadband provider.

In some embodiments of the present technology, audio capabilities for the mobile device 300 are provided by an audio I/O component 328 including a speaker to output audio signals and a microphone to receive audio signals.

The illustrated mobile device 300 also includes a slot interface 330 for accommodating a subscriber identity system 332 such as, for example, a subscriber identity module (SIM) card, a universal SIM (USIM) card, or a universal integrated circuit card (UICC). Alternatively, the subscriber identity system 332 can be manufactured into the device 300, thereby obviating the need for a slot interface 330. In some embodiments, the subscriber identity system 332 stores information associated with determining location of the mobile device 300 according the methods described herein.

The subscriber identity system 332 may, e.g., store information including user preference factors and/or administrative factors set by an administrator, manufacturer, or service provider, which are described in more detail below. In some embodiments, the subscriber identity system 332 is programmed by a manufacturer, a retailer, a user, a computer, a network operator, or the like.

The illustrated mobile device 300 also includes an image capture and processing system 334 (image system). Photos can be obtained via an associated image capture subsystem of the image system 334, for example, a camera. The illustrated mobile device 300 also includes a video system 336 for capturing, processing, recording, modifying, and/or transmitting video content.

The illustrated mobile device 300 also includes a power source 340, such as batteries and/or other power subsystem (AC or DC). The power source 340 can interface with an external power system or charging equipment via a power I/O component 342.

The illustrated mobile device 300 also includes a positioning and location component 338. The component 338 can be configured for determining position or orientation-related characteristics of the device 300, such as a geographic location and an orientation. While a single box is shown to represent the component 338 in FIG. 3, the component can include multiple components, as with every component shown in the figures. The location component 338 may include, for example, a GPS receiver and/or a tri-axial accelerometer. In one embodiment, the component includes a pedometer.

V. Methods of Operation—FIGS. 4-7

FIGS. 4-7 illustrate schematically flows, including algorithms, in the form of methods 400, 500, 600, 700, for performing various operations of the present technology.

It should be understood that the steps of the methods 400, 500, 600, 700 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated methods can be ended at any time.

Aspects of the methods 400, 500, 600, 700 presented represent algorithms defining how the one or more applicable mapping server 200s operate. And aspects of the methods 400, 500, 600, 700 can be implemented in connection with the structure and software described above in connection with FIGS. 1-3. In the following descriptions, reference will at times be made to the area 100 and transmitters 102 shown in FIG. 1.

In certain embodiments, some or all steps of these processes 400, 500, 600, 700 and/or substantially equivalent steps are performed by one or more processors, such as the processors 204, 304 described above, executing computer-readable instructions stored or included on one or more computer-readable media, such as the memory 206, 306 of the mapping server 200 and/or mobile device 300, for example.

Accordingly, one or more of the operations of the methods 400, 500, 600, 700 are in various embodiments performed by a server or other computer, like the computing system 200 of FIG. 2, and one or more of the operations are in various embodiments performed by a mobile device, like the device 300 of FIG. 3.

V.A. Generating an Area Wireless Profile or Map—FIG. 4

Figure 4:
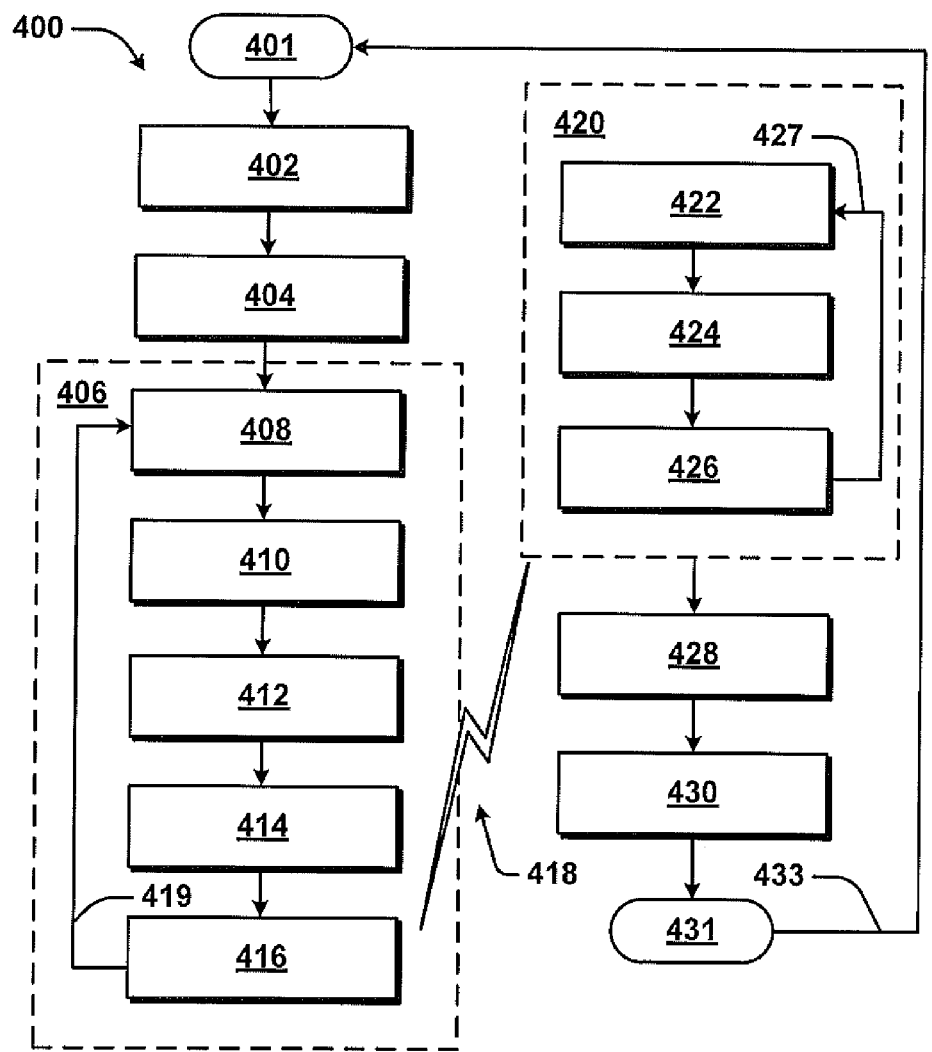
FIG. 4 illustrates schematically operations of a method for generating a wireless signal map and a wireless/geo map, corresponding to the area of FIG. 1, using feedback from multiple mobile devices moving or having moved in the area.

FIG. 4 shows a method 400 for generating a radio-frequency map, corresponding to an area, such as an interior of a building like the building 100 of FIG. 1, according to embodiments of the present technology. As mentioned, the map can be referred to by other names, such as wireless map, wireless profile, area RF profile, RF profile map, a wireless area profile, the like, or other.

One or more of the operations of the method 400 are in various embodiments performed by a server or other computer, like the computer 200 of FIG. 2, or a mobile device, like the device 300 of FIG. 3.

Aspects of the method 400 are performed using multiple transmitters, like transmitters 102 shown in FIG. 1, and feedback from multiple mobile devices, like the mobile device 300 of FIG. 3, moving or having moved in the area.

The method 400 begins at block 401 and flow proceeds to block 402, whereat multiple transmitters 102 are positioned at various locations within the area. The transmitters 102 are positioned strategically to render the most accurate data about mobile device movement with respect to the transmitters 102. In some embodiments, for instance, one or more of the transmitters 102 are positioned preferably at turns within the area, or locations where people tend to change directions when walking.

As mentioned, height of the transmitter locations can be selected as those expected to best facilitate communication with the participating mobile devices 300 passing through the area 100. A preferred height of positioning is in some cases a relatively high point in the vicinity, such as at or near a top of the transition point, e.g., at or near the highest point of a corner 104, 106. As also referenced, example positions include on a wall at a corner 104, 106 where two or more hallways 108, 110, 112 meet or intersect, and on walls or door frames adjacent entrances, such as to conference room 118, office 120, staircases, buildings, mall stores, grocery stores, parks, amusement park rides, etc.

In the example of FIG. 1, twelve transmitters $102^1$-$102^{12}$ are positioned at select locations within the building 100. The locations in the example include at least one transition point (i.e., a place where people would typically change directions when walking, such as a corner 104, 106, entry or exit to a staircase, an entryway to an office 120 or conference room 118, or an entrance or exit to the area 100, or a hallway 108, 110, 112 or a walking path (e.g., hiking path) thereof). Each of the transmitters 102 shown in FIG. 1 is located selectively in this way.

A first transmitter $102^1$ of the group is positioned as shown in FIG. 1 at an outside corner 104 of the interior of the area 100. With further reference to FIG. 1, a second transmitter $102^2$ of the group is positioned at an inside corner 106 of the area 100.

With continued reference to FIG. 4, with the transmitters 102 in place, flow continues to block 404 whereat a first mobile device 300 moves within the area 100. In a hypothetical, a first mobile device 300 is moving through a first hall 108 of the area 100.

At block 406, the mobile device 300 receives wireless signals, e.g., radio frequency signals, from the transmitters within range. In the hypothetical using the structure 100 of FIG. 1, the device 300 moving down the first hall 108 is within range of, e.g., the first two transmitters $102^1$, $102^2$, and begins receiving signals transmitted therefrom. Hypotheticals are constructed herein for teaching purposes—in an actual implementation of a layout like that of FIG. 1, for example, with relatively-high strength transmitters 102, a mobile device 300 moving in any location in the building 100 would likely be receiving signals from more than two transmitters 102 and perhaps most or all of the transmitters 102 in the vicinity, e.g., on the floor or in the office suite of the building.

In some embodiments, custom software of the mobile device 300 is triggered into operation, or into a different mode of operation, by any of one or more triggers. In one embodiment, the mobile device 300 sensing a signal from one of the transmitters 102 triggers operation at the mobile device 300 of a custom software program, or application, configured to measure signal strengths and process (e.g., store, package, and share) the signal strength data.

In one embodiment, the application of the mobile device 300 is configured to cause the mobile device 300 to check for signals only periodically following a determination that no signals, or no significant (supra-threshold) signals are being received, or not received for a period of time. One benefit of having a triggering event, and perhaps a corresponding sleep mode for when there is no trigger, or no trigger after a period of time, is a saving of battery power and processing resources at the device from not continuously seeking and/or processing signals.

In one embodiment, the application is configured to include a mode causing the mobile device 300 to only rarely sense for subject signals and, in response to a trigger, such as determining that a sufficient signal was received from one or more transmitters, switch to another mode wherein the device 300 collects and measures signals more frequently, i.e., at a higher density.

At block 408, the mobile device 300, at a first time (e.g., t=1), determines a first strength value of each RF signal being received at the device 300.

At block 410, the mobile device 300 stores determined strength values at the device 300, or at least caches them, before transmitting the values to a mapping server 200, e.g., server 200.

In a contemplated embodiment, the device 300 compares signal strengths to a pre-set threshold strength, and some processing (e.g., the storing/caching) is performed only in connection with signal strength values that are above, or at or above, the threshold. Benefits of this approach include increased accuracy of the method 400 by avoiding errors that may be associated with receiving and measuring very low-strength signals.

At block 412, the mobile device 300, as part of the storing or caching of the previous step 410 or separately, generates respective data structures, in connection with each signal strength value (or each value above said threshold), including the strength measured and any related, ancillary data. In one embodiment the ancillary data includes a time at which the corresponding signal was transmitted or received at the device 300, or a time at which the signal strength was measured. Transmittal time may be stamped into the signal transmitted by the transmitter 102, for instance. The time incorporated into each data structure can be referred to as a time stamp.

In one embodiment, the ancillary data includes identification of the mobile device 300. The mobile device ID can take any of a variety of forms, such as a mobile identification number (MIN), mobile subscription identification number (MSIN) or an international mobile subscriber identity (IMSI). In a contemplated embodiment, the custom software used on each participating mobile device 300, and interacting with custom software on the subsequent processing system 200, includes a unique number corresponding to the participating mobile device 300.

In one embodiment, the ancillary data includes identification of the transmitter 102 from which the signal was received. Transmitter ID may be stamped into the signal transmitted by the transmitter 102. The transmitter ID can take any of a variety of forms, such as a media access control (MAC) address.

Other example ancillary data components include data indicating device movement or positional characteristics, such as device orientation, device location (e.g., altitude, or geographic coordinates of the mobile device 300 just before it entered the area 100 or at one location in the area 100 at which GPS was usable), or data indicative of location, movement, or positioning, e.g., acceleration, ambient pressure, compass, speed or velocity or other kinematic data.

Each data structure, including a signal strength value and corresponding ancillary data (e.g., time, device ID and/or transmitter ID stamps), can be embodied in any of a wide variety of formats. In one embodiment, data of each data structure is incorporated into one or more fields of a data packet. In one embodiment, data of each data structure is included in one or more columns or rows of a matrix, chart, or the like.

When multiple pieces of data relate, such as by a time stamp, device orientation, and/or a transmitter identification being associated with a signal strength measured, the various pieces of data can be associated and referred to as a data packet, data set, or the like. Data sets can be stored or cached at the device 300 in any of a wide variety of formats, including simply as distinct data sets, or as a data set (e.g., columns or rows) within a table or matrix.

In a contemplated embodiment, each of various data components, e.g., data structures, data set, data packet, matrix, or table, is dedicated to one or more characteristics, such as to a particular transmitter 102 or transmitters 102 and/or to a specific time or time span.

Below is an example data set, or representation of the data in a set, for a device 300 (DEV1) regarding a single wireless signal received from an access point 102 (MAC1).

TABLE 1

| Mobile Device | DEV1 |
|---|---|
| Time | 12:34:56:78 |
| Access Point | MAC1 |
| Signal Strength | 12.34 |

While various forms of signal data processing, including storing, caching, packaging, packetizing, etc., may be performed, additional example processing is described. At block 414, the mobile device 300 prepares to send data collected in connection with the first time instance (t=1) to the mapping server 200. In one embodiment, this operation includes combining into a data packet or data structure, data associated with multiple signals measured (e.g., combining data associated with multiple signals measured into a data packet or data package). A resulting data packet can include, e.g., multiple data sets, each including a respective RF signal strength measured at the device 300 and ancillary data (e.g., device ID, time, and transmitter ID stamp) associated with the measured strength.

Below is an example data packet, or representation of the data in a packet, for a device 300 (DEV1) regarding multiple wireless signals received from a first four access points 102 (MAC1-MAC4) at one time. The packet may be referred to as a fingerprint, an RF print, a signal print, or the like, of the mobile device 300 for the corresponding time instance.

TABLE 2

| Mobile Device | DEV1 | | | |
|---|---|---|---|---|
| Time | 12:34:56:78 | | | |
| Access Point | MAC1 | MAC2 | MAC3 | MAC4 |
| Signal Strength | 12.34 | 12.41 | 7.61 | 7.5 |

At block 416, the mobile device 300 transmits 418 the data packet, or fingerprint, to the mapping server 200. The transmission 418 can be made by way of wireless and/or wired connection(s). The mapping server 200 can be any device separate from the transmitting mobile device 300. The mapping server 200 can be, e.g., another mobile device (e.g., another participating mobile device moving or having moved in the area and collected signal strength data), in or outside of the subject area 100. In one embodiment, the mapping server 200 is a server.

In a contemplated embodiment, a single mobile device 300 containing the custom software package performs all computing functions described herein, including collecting strength values of wireless signals over time, processing the same with ancillary data, including time stamps for the signals, transmitter IDs, and possibly other ancillary data mentioned such as device orientation, and uses the data to generate the products described herein (e.g., RF map, RF/geo map, and architectural map).

For embodiments in which the mobile device 300 transmits data structures, as mentioned above, the transmission can be made by way of any communication channel, such as by way of one of the transmitters 102, being a transceiver, and/or by way of a cellular network (not shown in detail). The transmission can also be fulfilled in part using the Internet and/or an intranet. As referenced above, the communication channels used, e.g., Internet, are indicated schematically in FIG. 2 by reference numeral 212.

The routine including the operations of blocks 408-416 are repeated in connection with successive time instances following the first time, as indicated by return path 419 in FIG. 4. Following the symbolism whereby the first instance is represented as t=1, the subsequent instances can be represented by t=2, t=3, etc., where the t values (1, 2, 3, etc.) represent sequential instances and not a time increments. E.g., t=2 corresponds to a second instance in time at which one or more RF signals are received and measured, and not a 2=second point in time, not a 2-millisecond (ms) point in time, etc.

A dependent routine 420 uses the data received from the base routine 406 described above. While the dependent routine 420 is described primarily herein in connection with operation of the mapping server 200, (i) the mapping server 200 may be a second mobile device, other than the mobile device 300 that performed the base routine 406, and (ii) any one or more of the functions of the routine 420 can be performed by the same wireless device 300 that performed the base routine 406.

Thus, in one embodiment, a mobile device 300 performs the dependent routine 420 using data received from one or more other mobile devices executing the base routine 406 from the vantage of those other devices. In one embodiment, a mobile device 300 performs the dependent routine 420 using data generated at the same device 300 executing the base routine 406. In one embodiment, a mobile device 300 performs the dependent routine 420 using data generated at the same device 300 executing the base routine 406 in addition to using data received from one or more other mobile devices executing the base routine 406 from the vantage of those other devices.

Regarding the dependent routine 420, generally, the computer-executable instructions of the mapping server 200 (e.g., server 200), which can also be referred to as a mapping server 200, mapping system 200 or server 200, are configured to cause the processor of the mapping server 200 to reach various initial conclusions about movement of the mobile device(s) 300 with respect to the transmitter(s) 102. The computer-executable instructions of the mapping server 200 (e.g., server 200) are further configured to cause the processor of the mapping server 200 to process the initial conclusions to reach additional conclusions, such as an RF profile corresponding to each location in the area from which RF signals can be received, or from which RF signals above said threshold can be received.

As mentioned, each mobile device 300 may be programmed to include a threshold signal strength value, or mobile-device threshold, and only process (e.g., store) signal strength data and ancillary data (e.g., time and transmitter identification) in connection with signals exceeding in strength the mobile-device threshold. In a contemplated embodiment, the mapping server 200 is programmed to include a threshold value, or remote-device threshold. In one embodiment, the mapping server 200 (e.g., mapping server 200) uses only data from data packets in which wireless signal strength is above the remote-device threshold. In a particular implementation, the mobile device 300 uses the mobile-device threshold to screen out correspondingly-low signal data and the mapping server 200 also uses a different remote-device threshold, e.g., having a higher sensitivity (i.e., screening out more data) than the mobile-device threshold.

With continued reference to the flow of FIG. 4, at block 422, the mapping server(s) 200 (e.g., server 200) processes received data, generated at the mobile device 300 while the device(s) 300 moved in the area 100 over time, to determine movement and positional characteristics for the mobile device 300 with respect to the transmitter 102 or transmitters 102 from which RF signals were received and measured at the device 300 over a period of time.

For the processing, the computer-executable instructions used by the mapping server 200 (e.g., server 200) are configured according to various applicable maxims. For instance, for the processing 422, the instructions are in one embodiment configured to cause the performing device processor 204 to determine that a mobile device 300 is or was moving toward a particular transmitter (e.g., 102') during a period of time for which the signal-strength data received from that mobile device 300, concerning the particular transmitter (e.g., 102') indicates that the strength of signal received from the transmitter 102 is increasing.

Similarly, the instructions are in one embodiment configured to cause the performing device processor 204 to determine that a mobile device 300 is or was moving away from the particular transmitter (e.g., 102$^1$) during another period of time for which the signal-strength data received from that mobile device 300 concerning the particular transmitter 102 indicates that the strength of signal received from the transmitter 102 is decreasing.

The instructions are configured to cause the mapping server 200 to determine, in one or more ways, a point in time at which a mobile device 300 is directly adjacent a transmitter 102. One way is to conclude that the mobile device 300 has just passed a particular transmitter 102 when the RF signals from that transmitter 102 being measured at the device 300, and passed on to the processing device (e.g., server 200), change from increasing over time, as the device 300 is approaching the particular transmitter 102, to decreasing over time, as the device 300 then begins to depart from the particular transmitter 102.

Another manner for the mapping server 200 (e.g., server 200) to determine that the mobile device 300 has just passed a particular transmitter 102 is by analyzing a rate of change of the RF signal strengths being measured at the device 300, and passed on to the processing device (e.g., server 200). If the rate of change approaches zero, either the mobile device 300 has stopped moving, or the device 300 is adjacent the transmitter 102. When the device 300 is adjacent the transmitter 102, changes in device position will result in lower changes in strength of signals from the particular transmitter 102 than when the device 300 moves by the same amount while farther from the particular transmitter 102. This technique is especially effective when the particular transmitter 102 is positioned at or near what may be referred to as a transaction point, or point at which users typically slow down for one reason or another. Example transaction points include places where users tend to change directions, such as by turning left or right (e.g., a corner 106 where two hallways 108, 110 meet), or preparing to ascend or descend (e.g., entering or exiting stairwell, or escalator), or at or near places where users change sub-areas of the area 100, such as from a hallway 110, 112 to a room 118, 120. In one embodiment, a transaction point includes an attraction often causing users to slow, such as an arrival/departure board at an airport, a news/stock ticker display in a hallway, a piece of art, or an attractive view (e.g., landscape).

Still another technique for the mapping server 200 (e.g., server 200) to determine that the mobile device 300 has just passed a particular transmitter 102 is by recognizing that the RF signal strengths measured at the device 300, and passed on to the mapping server 200 (e.g., server 200), have reached to or to approximately a known maximum signal strength for the particular transmitter 102.

It should be appreciated that restarting calculations of mobile device travel as the mobile device 300 passes access points 102 reduces error in tracking of the mobile device 300. This is because, generally, confidence in, or accuracy of, movement calculations decrease with time and movement of a device 300 away from a reference point, wherein any even slight errors compound over the time. For this reason, having more access points 102 is beneficial. Also for this reason, using more samples, from more mobile devices 300 or the same mobile device 300 moving through the area 100 is beneficial, as average values (e.g., for RF signal strength or distances determined) can be determined and used instead of values from just a single mobile device 300.

Continuing with the flow of FIG. 4, at block 424, the mapping server 200 determines spatial relationships between the mobile device 300 and the transmitters 102 from which the mobile device 300 receives wireless signals, and associates RF signal strength values with the determined relative positions. The determinations are made using the movement and positional characteristics determined (e.g., block 422), and in some embodiments using additional information.

The additional information can include, e.g., an average walking speed of users moving in the subject area 100 or in any area, such as an average straight-ahead walking speed or an average turning (i.e., rounding-corner) walking speed.

In operation, the mapping server 200 determines distances separating the mobile device 300 and transmitter 102 using the signal strength data collected while the device 300 is/was moving toward and away from the transmitter 102, and using actual (e.g., measured) or average walking speed. From a point at which the mobile device 300 is determined, using one of the techniques described above, to have just passed a particular transmitter 102, the mapping server 200 can determine an expected distance that the mobile device 300 should be from the transmitter 102 at various times using the walking speed.

The mapping server 200 can thus relate the determined distances from the particular transmitter 102, in connection with various time instances following the mobile device 300 passing the particular transmitter 102, with the signal strength measurements received from the mobile device 300 in connection with the same time instances. Relating the distances from the particular transmitter 102 with signal strength can include storing the strength and distance in a data structure (e.g., packet or matrix entry) with association in the structure to the particular transmitter 102.

The remote system 200 can also determine distances that separated the mobile device 300 from the particular transmitter 102 in connection with various time instances prior to the mobile device 300 reaching and passing the particular transmitter 102 based on the time at which the mobile device 300 is determined to have passed the particular transmitter 102 and the walking speed (actual or average) at which the mobile device 300 was moving in those time instances preceding and up to the time of passing the particular transmitter 102.

Device-to-transmitter relative positioning data is determined in connection with the mobile device 300 and each transmitter 102 from which wireless signals are received (or from which wireless signals above any threshold(s) in place). The mapping server 200 analyzes simultaneously spatial relationships regarding the mobile device 300 and multiple transmitters 102, e.g., spatial relationships between the mobile device 300 and the first and the second transmitters $102^1$, $102^2$.

In one embodiment, in addition to or separate from being programmed to execute the above-described means to determine device-to-transmitter spacing, the mapping server 200 is programmed to determine device-to-transmitter spacing using pre-established transmitter signal strength values. The values can be stored, e.g., at the mapping server 200, such as in a chart or matrix of signal strength and distances.

The information can indicate, for example, that the mobile device 300 must be 15 feet away from a particular transmitter 102 when the mobile device 300 is registering a corresponding signal strength, must be 10 feet away from the particular transmitter 102 when the mobile device 300 is registering a (higher) corresponding signal strength, must be 20 feet away from the particular transmitter 102 when the mobile device 300 is registering a (lower) corresponding signal strength, etc.

With continued reference to the FIG. 4, at block 426 the mapping server 200 determines relative positioning of the various transmitters 102. The mapping server 200 determines the transmitter-to-transmitter positioning using the device-to-transmitter relative positioning data calculated in the last operation 424 with respect to the mobile device 300 and multiple transmitters 102. The mapping server 200 in various embodiments also uses ancillary data, such as orientation information about the device 300, indicating, for instance, whether the device 300 was turning toward the left or toward the right as it passed one or more of the transmitters 102.

The mapping server 200 can determine, for example, that two transmitters (e.g., $102^1$, $102^4$) are thirty feet apart based on determinations that the mobile device 300 was directly adjacent a first of the two transmitters ($102^1$), departed from adjacent the first transmitter ($102^1$), and moved, per actual or estimated walking speed, thirty feet before arriving directly adjacent the second of the two transmitters ($102^4$).

The mapping server 200 can also determine directional relationships between the two transmitters 102. In one way, the mapping server 200 uses mobile-device orientation information, such as measured by accelerometer at the device 300, and received at the mapping server 200.

The mapping server 200 can, e.g., use orientation information that is available concerning a turn that the mobile device 300 made at the second transmitter ($102^4$), as the mobile device 300 turned to walk toward a subsequent transmitters (e.g., $102^{11}$), to determine the directional relationship between the first, second, and third of these transmitters (e.g., $102^1$, $102^4$, $102^{11}$).

As referenced, the relative positioning can include determining relative altitudes, e.g., of the mobile device 300 with respect to the transmitters 102 with respect to each other (step 424) or of the transmitters 102 with respect to each other (step 426). The relative altitudes can be determined based on altitude or altitude-related data from the mobile device 300, such as based on measurements by an altimeter or other pressure-measuring sensor at the mobile device 300. Altitudinal information may be associated with, and then represented by, a corresponding level or sub-area of the area 100, such as a floor of a building.

The dependent routine 420 including the operations of blocks 422-426 are repeated in connection with other mobile devices 300, as indicated by return path 427 in FIG. 4.

With continued reference to the flow of FIG. 4, at block 428, the mapping server 200 (e.g., remote server 200) generates a wireless signal map for the subject area (e.g., interior 100).

The map may be referred to by other names, such as an area wireless signal distribution map or profile, or a radio-frequency map or profile. It is preferred in most embodiments that the map be generated without the use of specific pre-existing tools or data, just the information structures generated herein, i.e., the RF map may be generated without use of a pre-existing building map and without use of information identifying exactly where the transmitters 102 are located.

For forming the RF map, the mapping server 200 uses the relative positioning and directional data (e.g., relative spacing and directional relationship between transmitters 102 in the area 100) generated in the previous steps.

It should be appreciated that the processes of determining the relative positioning, of the mobile devices 300 to the transmitters 102 (step 424) and between the transmitters 102 (step 426) is, generally, made more accurate by crowd sourcing, e.g., when the supporting data is received from more mobile devices 300 moving, or having moved, in the area 100. By using data from more mobile devices 300, or crowd sourcing, an effect of any error in data received is lowered or minimized as more accurate data corresponding to the same measurement (e.g., signal measurement with respect to the same transmitter 102) is considered. Errors may include, for instance, error in wireless-signal strength measurement at the mobile device 300. Errors may result also from a user moving with their mobile device 300 faster or slower than an assumed or average speed used in calculating device-to-transmitter distance.

In one embodiment, a statistical centroid of data received from multiple mobile devices 300 is developed, such as a statistical centroid of data indicating distances separating a particular transmitter 102 from a mobile device 300, or of data indicating distances separating transmitters 102.

In one embodiment, the remote server 200 is configured to employ a control limit theorem, or an inter-cortile, or other, elimination techniques to increase accuracy of results. The techniques may include, e.g., removing automatically a certain number or percentage of outlying values received or determined signal strength, device-to-transmitter distance, or transmitter-to-transmitter distance. The techniques may include, e.g., removing automatically outlying values being those beyond a pre-set threshold value, e.g., signal strengths beyond a signal strength threshold, device-to-transmitter distances beyond a threshold, or transmitter-to-transmitter distances beyond a threshold.

Regarding the area signal print generated, the print may, as with the relative mobile-device-to-transmitter and transmitter-to-transmitter data or resulting maps, include altitude or an altitude-related indication. Again, relative altitudes, e.g., of the mobile device 300 with respect to the transmitters 102 with respect to each other (step 424) or of the transmitters 102 with respect to each other (step 426), can be determined based on altitude or altitude-related data from the mobile device 300, such as based on measurements by an altimeter or other pressure-measuring sensor at the mobile device 300. And, again, altitudinal information may be associated with, and then represented by, a corresponding level or sub-area of the area 100, such as a floor of a building.

The area wireless profile associates each of numerous intra-area fingerprints or signal prints, with a respective intra-area location. As an example, a particular signal print (see e.g., Table 2, above) can be associated in the area wireless profile with a location that can be described with respect to features of the area (e.g., an entry point or primary corner or center thereof) and/or with respect to one or more of the transmitters 102. As an example of the first, an area-specific measurement, the measurement may relate to one or more transmitters or access points 102, e.g., 2.4 meters north and 7.8 meters east of AP1, 9.8 meters west and 16.5 meters south of AP2, etc. As an example of the second, an area-specific measurement, the measurement may relate to a feature of the area or an area-feature-specific measurement, e.g., 10.5 meters north and 15.9 meters east from a south-east corner of the area.

At block 430, the mapping server 200 (e.g., server 200) can determine geographic locations for intra-area positions by relating determined intra-area position data to known geographic information, such as global coordinates. Geographic locations (e.g., latitude and longitudinal coordinates) corresponding to determined intra-area positions can be determined by, e.g., extrapolation using one or more known geographic locations.

For instance, having data indicating relative positioning of multiple structures within a building, such as a distance from a main entrance to a first corner of the building, and having GPS coordinates of the main entrance, the geographic location of the first corner can be easily determined, though GPS may not be available in the building. This process can consider multiple geographic data inputs, such as known GPS coordinates associated with multiple building entrances/exits. The process can be extended to identify a geographic location of any position or structure in the building.

And again, the resulting map may include altitudinal information or translations of the same, such as indications of floor(s) or level(s) of the area 100.

The resulting geographic-related data can be referred to as an area RF/geo map, an area RF/geo profile, an area RF/geo signal print, or the like. The data associates each of numerous intra-area fingerprints with a respective geographic location (e.g., a lat./long. coordinate pair).

The method 400 may end at block 431 or be repeated, as indicated by return path 433, such as in connection with another area or again regarding the same area 100 to account, e.g., for any changes to the area 100, which may result in changes to user movement, such as new hallways, new or moved furniture, etc.

V.B. Determining Intra-Area Device Location—FIG. 5

Figure 5:
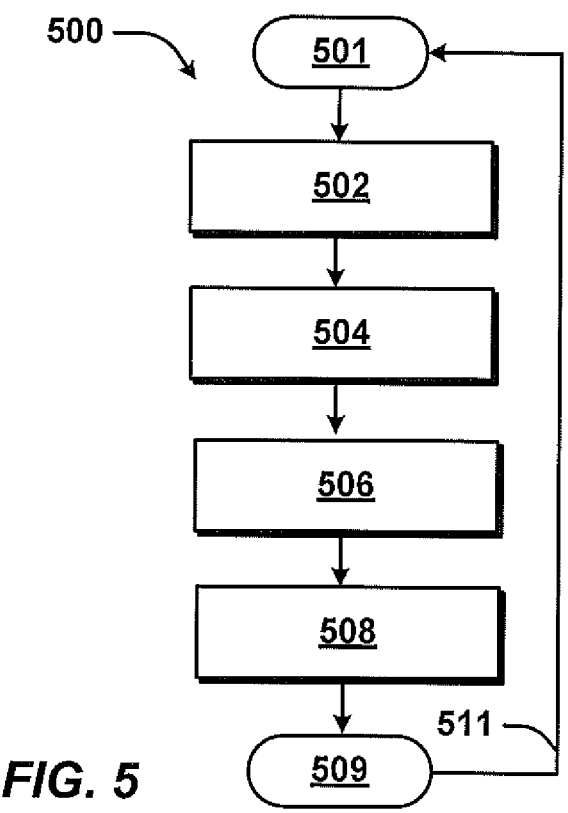
FIG. 5 illustrates schematically operations of a method for determining an intra-area location of a subject mobile device using feedback from the subject device and the wireless signal profile generated according to the method of FIG. 4.

FIG. 5 shows a method 500 for determining a location of a subject mobile device 300, according to embodiments of the present technology. The method 500 is performed using feedback from the subject mobile device 300 and using the RF map for the area 100 generated in the method of FIG. 4 (e.g., operation 428).

While the method 500 is described primarily herein in connection with operation of the system 200 shown in FIG. 2, and referred to as the mapping server 200, the performing system is in some embodiments the subject mobile device 300 or another mobile device. The mapping server 200 can be the same or different than any device involved with the method 400 of FIG. 4.

The method 500 begins at block 501 and flow proceeds to block 502, whereat the mapping server 200 obtains a wireless fingerprint, or signal print corresponding to an instant (or current) position of the subject device 300. Underlying data for the signal print is generated at the subject device 300 measuring wireless signals received at the subject device 300, such as described above in connection with operations 406-410.

If the performing device is a mapping server 200 (e.g., remote server 200) distinct from the subject device 300, then obtaining the wireless signal print, in operation 502, includes receiving at least one message from the subject mobile device 300 indicating the instant wireless signal print. In one embodiment the instant (or present, or current) wireless signal print can take the form of Table 2, above, or otherwise include such information.

As before, the message can have any of a variety of forms and be transferred or routed in any of many ways, by way of any one or more of a wide variety of networks. The networks may include at least one cellular communication network, of any service provider, and the internet and/or an intranet.

At block 504, the mapping server 200 obtains area wireless signal map data, such as the area wireless profile generated in connection with operation 428 of the method 400 of FIG. 4. If the mapping server 200 is the subject device, obtaining the area signal print can include receiving the area signal print from another device (e.g., remote server 200).

At block 506, the mapping server 200 determines an intra-area 100 location, of the area signal print, corresponding to the instant wireless signal print of the subject device 300.

The intra-area 100 location may have any of a variety of forms, such as area-specific coordinates or measurements.

As provided in the examples above, an area-specific measurement may relate to one or more transmitters or access points 102, e.g., 2.4 meters north and 7.8 meters east of AP1, 9.8 meters west and 16.5 meters south of AP2, etc. and an area-specific measurement may relate, e.g., to a feature of the area or an area-feature-specific measurement, e.g., 10.5 meters north and 15.9 meters east from a south-east corner of the area 100.

At block 508, the location determined in the previous step 506 can be communicated as desired, such as by providing the information via a display 302 and/or audio device 328 (e.g., speaker) of the subject device 300 for advising a user of the subject device 300. Communicating the location determined can also include, e.g., sending the location information to a destination device, such as a remote server 200, being the same or different than the server 200 that may have been involved with the methods 400, 500 up to this point.

The method 500 may end at block 509 or be repeated, as indicated by return path 511, such as in connection with another subject device or in connection with the same subject device 300, which may have moved.

The resulting data can be used beneficially in a variety of ways. Advertising entities, for instance, may be interested to know where customers or potential customers in an area 100 (e.g., mall, amusement park, and grocery stores) are located. Retail entities may like to know how customers move in or near a defined area 100 (e.g., brick-and-mortar store) for various uses, e.g., for determining whether to send offers or coupons to users in a certain sub-area or otherwise moving in the area 100 in a certain way, or whether to adjust design of the area 100 (e.g., move grocery store aisles, shelving, or other display feature) to promote different movement patterns.

Emergency personnel would also benefit from knowing where a user holding the subject device 300 is positioned in the area 100.

Other beneficial uses of the location information are referenced above and provided below.

V.C. Determining Geographic Device Location—FIG. 6

Figure 6:
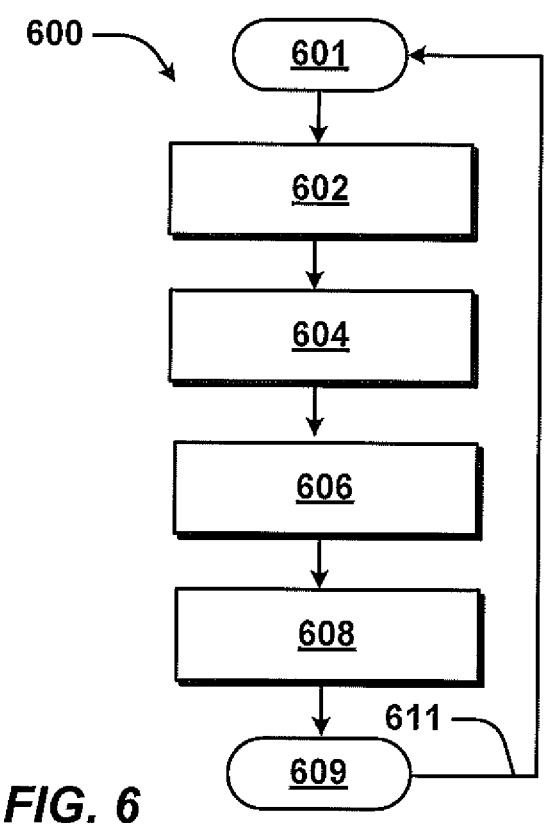
FIG. 6 illustrates schematically operations of a method for determining a geographic location of a subject mobile device using feedback from the subject device and the wireless/geo map generated according to the method of FIG. 4.

FIG. 6 shows a method 600 for determining a geographic location of a subject mobile device 300, according to embodiments of the present technology. The method 600 is performed using feedback from the subject mobile device 300 and using the wireless/geo map or profile for the area 100 generated in the method of FIG. 4, e.g., operation 430.

As with the method 500 of FIG. 5, while the method 600 of FIG. 6 is described primarily in connection with operation of the system 200 shown in FIG. 2, and referred to as the mapping server 200, the performing system is in some embodiments the subject mobile device 300 or another mobile device. The mapping server 200 can be the same or different than any device involved with the method 400 of FIG. 4.

The method 600 begins at block 601 and flow proceeds to block 602, whereat the mapping server 200 obtains a wireless fingerprint, or signal print corresponding to an instant (or current) position of the subject device 300. Underlying data for the signal print is generated at the subject device 300 measuring wireless signals received at the subject device 300, such as described above in connection with operations 406-410.

If the performing device is a mapping server 200 (e.g., remote server 200) distinct from the subject device 300, then obtaining the wireless signal print, in operation 602, includes receiving at least one message from the subject mobile device 300 indicating the instant wireless signal print. In one embodiment the instant (or present, or current) wireless signal print can take the form of Table 2, above, or at least include such information.

As before, the message can have any of a variety of forms and be transferred or routed in any of many ways, by way of any one or more of a wide variety of networks. The networks may include at least one cellular communication network, of any service provider, and the internet and/or an intranet.

At block 604, the mapping server 200 obtains area wireless signal/geo map data, if any, such as that generated in connection with operation 430 of the method of FIG. 4. If the mapping server 200 is the subject device, obtaining the signal/geo map or profile data can include receiving the profile or data from another device, such as the remote server 200.

At block 606, the mapping server 200 determines a geographic location corresponding to the instant wireless signal print of the subject device 300. In embodiments in which the wireless/geo map or profile is generated and obtained in step 604, the determination 606 can include using the wireless/geo map.

In another implementation, the mapping server 200 determines the geographic location using the instant wireless signal print of the subject device 300, but without using a wireless/geo map. The mapping server 200 may, e.g., use an intra-area location for the device 300, as determined for instance by the method 500 of FIG. 5, and reference that location to one or more known geographic positions, e.g., using known or determined geographic positions of the transmitters 102 indicated by the instant signal print for the subject device 300 and/or using known or determined geographic positions of area features, such as an entry way to the area 100.

The geographic location may have any of a variety for forms, such as global coordinates or measurements.

At block 608, the location determined can be communicated as desired, such as by providing the information via a display 302 and/or audio device 328 (e.g., speaker) of the subject device 300 for advising a user of the subject device 300. Communicating the location determined can also include, e.g., sending the location information to a destination device, such as a remote server 200, being the same or different than the server 200 that may have been involved with the methods 400, 500, 600 up to this point.

The method 600 may end at block 609 or be repeated, as indicated by return path 611, such as in connection with another subject device or in connection with the same subject device 300, which may have moved.

Again, the resulting data can be used beneficially in a variety of ways. Advertising entities, for instance, may be interested to know where customers or potential customers in an area 100 (e.g., mall, amusement park) are located.

And, again, emergency personnel would benefit from knowing where a user holding the subject device 300 is positioned in the area 100.

Other beneficial uses of the location information are referenced above and provided below.

V.D. Method for Generating an Architectural Map—FIG. 7

Figure 7:
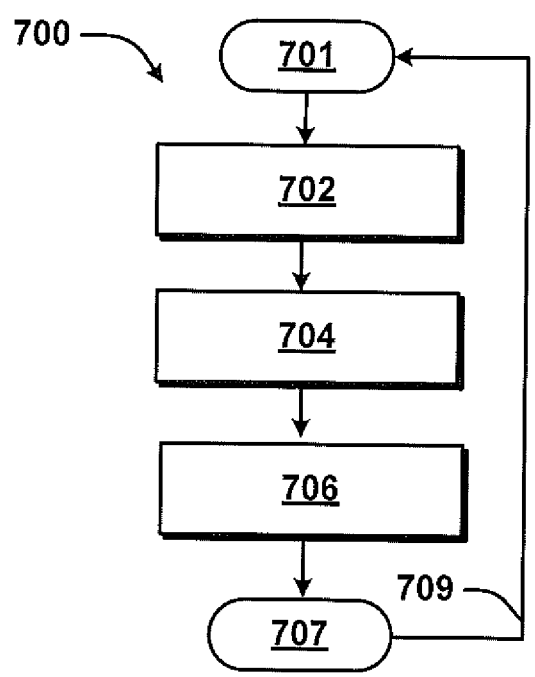
FIG. 7 illustrates schematically operations of a method for generating an architecture map and/or a walking path map of the area using the wireless signal map generated in the method of FIG. 4.

FIG. 7 illustrates a method for generating an architecture map of the area, according to embodiments of the present technology. The method 700 is performed using, directly or indirectly, the wireless signal-strength data determined at mobile devices 300 moving or having moved in the area 100.

Using the wireless signal-strength data of the mobile devices 300 directly may include, e.g., using data packets received from mobile devices 300 moving or having moved in the area 100. Using the wireless signal-strength data of the mobile devices 300 indirectly may include, e.g., using the wireless profile map generated in the method 400 of FIG. 4, operation 428.

While the method 700 is described primarily herein in connection with operation of the mapping server 200, the mapping server 200 may be a mobile device 300 in or outside of the area 100.

The method 700 begins at block 701 and flow proceeds to block 702, whereat the mapping server 200, executing custom computer-executable instructions, or code, analyzes the wireless signal-strength data, including any ancillary data, received from multiple mobile devices 300 moving or having moved in the area 100, or analyzes a wireless profile map, such as that generated in the method 400 of FIG. 4. The ancillary data may include, e.g., orientation of devices 300 as they move through the area 100. The data may also indicate that a device 300 slowed, e.g., to an average user turning speed, as it passed a transmitter 102, indicating that the transmitters $102^1$, $102^2$ are likely both adjacent a turn 109.

Other variables, which may be indicated by the ancillary data, that may be considered in determining movement paths, walking paths, and locations, sizes, and orientations of area structures (e.g., walls) can include angles of approach, deduced based on kinematic characteristics for one or more mobile devices 300 moving or having moved in the area, e.g., with respect to two or more transmitters 102.

At block 704, the mapping server 200, executing the code, determines apparent locations of structures, such as walls, corners, door openings, stair wells, offices, furniture, trees, fences, etc., based on the data analyzed in the previous step 702. The data may indicate, for instance, that mobile devices 300 consistently move along certain paths, or movement (or walking) paths. These movement, or walking, paths identified can be a distinct output, or product, of the present technology.

Based on the movement paths, and the underlying code, the mapping server 200 can determine, with reference to FIG. 1, for example, that two hallways (e.g., second and third hallways 110, 112) meet a certain intra-area location, and that certain of the access points 102 are positioned there (e.g., transmitters $102^3$, $102^4$, $102^5$, $102^6$).

The code can also be configured to cause the mapping server 200 to determine the size and orientation of the structures. If, for instance, the data indicates that of numerous (e.g., tens, hundreds, thousands, etc.) mobile devices 300 over time passing an access point, such as transmitter $102^6$ in FIG. 1, down a hall 110 toward another transmitter $102^8$, not one of them ever turns toward the right, the code could be considered to determine that a wall must be there, as indicated by reference numeral 114 in FIG. 1. The code may also be configured to, in this scenario, cause the mapping server 200 processor to determine that the wall 114 has a length equal approximately to a distance separating the transmitter $102^6$ starting that leg of the hall 110 to the end of the hall 110 transmitter $102^8$.

The code may cause the mapping server 200 to determine that the transmitter $102^6$ starts the leg considering, e.g., that mobile devices 300 often turn left there, toward the second door 116, and sometimes turn into what may be a conference room 118.

The code may cause the mapping server 200 to determine that the transmitter $102^8$ is at an end of the hall 110 considering, e.g., that mobile devices 300 never move beyond that point in the hall 110, only turning into what may be an office 120 or turning and re-tracking down the hall 110.

In one embodiment, the code is configured to cause the mapping server 200 to determine that an area is a special area in response to determining, according to mobile device 300 feedback indicating wireless signal strengths, that only certain mobile devices 300 enter the area. If only mobile devices 300 used by managers or supervisors enter an area, for instance, or also others only very rarely, then the area can be assigned in the architectural map as being an executive area, such as executive office or other executive space.

In another embodiment, the code is configured to consider mobile device identifications and movement within the area for determining the architecture and/or assignment for the sub-area. If mobile devices 300 often enter an area and stop in a rectangular or circular shape for a long period of time, then the room is considered a meeting or conference room including a table having the corresponding shape.

In a related example showing how the code can be configured to consider identification and movement of mobile devices 300 in the area to determine architecture and/or a sub-area assignment, the mapping server 200 can determine that only mobile devices 300 of non-managers, or even usually only mobile devices 300 of relatively low-level employees. The mapping server 200 can, in response, determine that the certain sub-area is an area dedicated to the worker functions performed by the lower-level employees.

In a contemplated embodiment, the code is also programmed with data related to the specific type of area being analyzed—such as data specific to grocery stores, amusement parks, public parks, shopping malls, etc. Making the scenario of the immediately preceding paragraph a grocery store scenario, the code may determine, using the area-specific (grocery store) data and mobile device identification and movement information, that sub-area may be, e.g., a stock room or a recycling/waste disposal sub-area.

The code may also be configured to consider more heavily, e.g., be programmed with a higher likelihood factor, that a sub-area may be of a certain type based also or instead on location of the sub-area within the area. If the sub-area of the scenario of the immediately preceding example was at an extreme rear of the building, and perhaps even extending outside what was determined an external building wall (i.e., the area can extend beyond a building wall and so include indoor and outdoor sub-areas), the code can lean the conclusion toward finding that the sub-area is apparently a recycling/waste disposal sub-area.

In another example involving a grocery store, or any brick-and-mortar shopping environment, the code may be programmed to cause the mapping server 200 to determine that customer mobile devices 300 do not enter a certain sub-area. The mapping server 200 determines, in response, that the area is an employee-only area, such as a stock area.

In some embodiments, the access points 102 are preferably positioned strategically to facilitate these such determinations by the software. As referenced, the access points 102 can be positioned at places where users tend to turn, or stop, such as at or very near corners 104, 106 of the area 100, doorways, staircase entries, etc.

At block 706, the mapping server 200 can add the structures identified in step 704 to a map being generated. The map can be generated from scratch, e.g., the mapping of the method 700 can be performed without need or use of any pre-generated or pre-available architectural map or base template for the area 100. As referenced, the mapping in some embodiments includes using wireless profile data generated according to the present technology, such as in step 428 of the method 400 of FIG. 4.

The operation 706 can include, e.g., adding digital representation of structures, such as walls, door openings, stair wells, offices, furniture, trees, fences, etc., to the map according to their determined locations, sizes, and orientations.

The method 700 may end at block 707 or be repeated, as indicated by return path 709, such as in connection with another area or again regarding the same area 100 to account, e.g., for any changes to the area 100, which may result in changes to user movement, such as new hallways, new or moved furniture, etc.

VI. Example Advantages and Benefits

Some of the benefits of the present technology are obtained by the crowd sourcing techniques disclosed. These benefits include improved accuracy, e.g., of maps generated, and reduced costs, such as costs that would otherwise be associated with using dedicated personnel and/or installation and use of more and/or more-expensive hardware.

Comparatively, providing a custom software application to common mobile devices, and later as needed providing updates to the application to participating mobile devices is relatively inexpensive.

Mobile devices of individuals who already move in the subject area, such as employees or contractors in a building being evaluated can be used, further saving cost.

In any event, conventional walk testing is not needed, and so costs associated with such testing is avoided. There is, e.g., no need to hire or assign people to walk through every corner of a building as a dedicated project, or need for specialized equipment, such as that configured to measure continuously distance from the equipment to adjacent walls.

Cost is further saved by avoiding any need for building or area layouts, such a pre-existing (e.g., prior to performance of methods described herein) building layout.

The technology can also beneficially be implemented using services of any wireless communications service provider, including any cellular or other long-range service provider, and any provider or short or medium-range wireless communications, on a worldwide basis.

The ability to load the custom software onto the mobile devices as a temporary install has benefits referenced above including freeing up mobile device memory and processing resources for other functions. For embodiments in which the software remains installed for a longer period of time, benefits include easy update to, or re-creation of, a report, e.g., indoor architectural map, to incorporate changes made to the subject area (e.g., walls or furniture removed, moved, or added).

Generated RF maps, RF/geo maps, walking path information, and intra-building layouts can be used for various purposes, as referenced above.

The technology can be used for determining an intra-building, local, or broader, e.g., global-reference, location of a mobile device moving in the area, as described in connection with the method 500 of FIG. 5, for instance.

The technology can be used for mapping movement or architecture within any sized building, from smaller houses and commercial structures, for instance, to much larger facilities. The technology can also or instead be used to map outdoors movement or architecture, as provided.

Retail entities may like to know how customers move in or near a defined area (e.g., brick-and-mortar store) for various uses (e.g., for determining whether to send offers or coupons to users in a certain sub-area or otherwise moving in the area in a certain way, or whether to adjust design of the area (e.g., move grocery store aisles, shelving, or other display feature to promote different movement patterns)).

A stadium operator may program their system to send coupons or other notifications regarding a particular vendor to users who are moving in a corresponding sub-area, or moving at a certain time (e.g., soon after a game starts, just before the seventh inning stretch, or towards an end of the game).

Output of the present technology can also be used advantageously as emergency guidance for first responders (e.g., firefighters). Emergency service providers such as police, EMS, and firefighters benefit tremendously from having access to interior maps of a building in which there is an emergency. Emergency personnel can review an interior map on a mobile device while en route to an incident and use the map onsite.

Another beneficial potential use is for a propagation modeling tool in designing indoor wireless systems, or evaluating indoor radio-frequency (RF) propagation for use in reconfiguration of an existing wireless scheme, transceiver locations, types, orientations, etc. There are tools available on the market, for computing indoor propagation, requiring as an input a building interior layout, which the present technology provides without need for a pre-generated mapping data.

Generated walking path information and generated intra-building layouts can be used for various purposes, as indicated above. Uses include emergency guidance for first responders (e.g., firefighters).

With an accurate architectural map as input, the wireless propagation characteristics and predictions can be accurately modeled to ensure desired coverage. Hardware, such as distributed antenna systems or high accuracy locating systems that are rapidly becoming the target of indoor location based advertisers, can be configured, positioned, and directed based on the accurate map data.

Still other users include construction contractors who can save time and cost working from the mapping data provided by the present technology. And, as also referenced, other users of accurate indoor map data include interior decorators and owners of property, governmental or private, such as shopping malls or office space. Custom government or enterprise software packages can incorporate accurate interior map data in a variety of ways, for example.

As another contemplated benefit referenced above, work of home or commercial construction contractors can be facilitated by accurate interior mapping provided by the present technology. They can save time and cost working from properly-formatted mapping data in preparing a remodel, for instance, without having to create a virtual mock-up on their own.

Other users that can benefit from the present technology include interior decorators and owners of property, governmental or private, such as shopping malls or office space.

Custom government or enterprise software packages requiring accurate intra-building architecture can incorporate interior map report data generated according the methods described herein.

VII. Conclusion

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely example illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method comprising:
receiving, by a system comprising a processor, from a mobile communication device, a wireless fingerprint generated by the mobile communication device, the wireless fingerprint corresponding to a location within a subject area at which the mobile communication device is or was positioned at a specific time, and the wireless fingerprint comprising at least one signal strength value of at least one signal received by the mobile communication device from at least one transmitter associated with the subject area, wherein the at least one signal strength value of the at least one signal is measured by the mobile communication device;
determining, by the system, based at least in part on the wireless fingerprint, a distance of the location within the subject area at which the mobile communication device is or was positioned from the at least one transmitter from which the at least one signal was received by the mobile communication device;
relating, by the system, the distance of the location from the at least one transmitter with the at least one signal strength value of the at least one signal received by the mobile communication device from the at least one transmitter; and
generating, by the system, an area wireless signal distribution map for the subject area, wherein the area wireless signal distribution map associates the location with the at least one signal strength value, wherein the location is defined with respect to the distance from the at least one transmitter.

2. The method of claim 1, wherein the wireless fingerprint further comprises an identification of the at least one transmitter associated with the subject area.

3. The method of claim 1, wherein the at least one signal strength value of the at least one signal is at or above a threshold, as determined by the mobile communication device.

4. The method of claim 1, wherein the wireless fingerprint further comprises an identification of the mobile communication device from which the wireless fingerprint is received, an identification of the at least one transmitter associated with the subject area, and a time stamp comprising the specific time.

5. The method of claim 4, wherein the time stamp corresponds to at least one of when the at least one signal was transmitted by the at least one transmitter to the mobile communication device, when the at least one signal was received by the mobile communication device, or when the at least one signal strength value of the at least one signal was measured by the mobile communication device.

6. The method of claim 1, wherein receiving the wireless fingerprint generated by the mobile communication device comprises receiving a plurality of wireless fingerprints from the mobile communication device, wherein the plurality of wireless fingerprints include the wireless fingerprint, wherein the plurality of wireless fingerprints comprise signal strength values of signals received by the mobile communication device from the at least one transmitter, wherein each of the plurality of wireless fingerprints corresponds to a respective location within the subject area at which the mobile communication device is or was positioned at a corresponding specific time, wherein the plurality of wireless fingerprints indicate a movement characteristic of the mobile communication device with respect to the at least one transmitter such that the mobile communication device is determined to be moving towards the at least one transmitter when the signal strength values of the signals from the at least one transmitter increase over a period of time, and wherein the signal strength values of the signals comprise the at least one signal strength value of the at least one signal of the wireless fingerprint.

7. The method of claim 1, wherein receiving the wireless fingerprint generated by the mobile communication device comprises receiving a plurality of wireless fingerprints from the mobile communication device, wherein the plurality of wireless fingerprints include the wireless fingerprint, wherein the plurality of wireless fingerprints comprise signal strength values of signals received by the mobile communication device from the at least one transmitter, wherein each of the plurality of wireless fingerprints corresponds to a respective location within the subject area at which the mobile communication device is or was positioned at a corresponding specific time, wherein the plurality of wireless fingerprints indicate a movement characteristic of the mobile communication device with respect to the at least one transmitter such that the mobile communication device is determined to be moving away from the at least one transmitter when the signal strength values of the signals from the at least one transmitter decrease over a period of time, and wherein the signal strength values of the signals comprise the at least one signal strength value of the at least one signal of the wireless fingerprint.

8. A system comprising:
a processor; and
a computer-readable medium comprising computer-executable instructions that, when executed by the processor, cause the processor to perform operations comprising:
receiving, from a mobile communication device, a wireless fingerprint generated by the mobile communication device, the wireless fingerprint corresponding to a location within a subject area at which the mobile communication device is or was positioned at a specific time, and the wireless fingerprint comprising at least one signal strength value of at least one signal received by the mobile communication device from at least one transmitter associated with the subject area, wherein the at least one signal strength value of the at least one signal is measured by the mobile communication device,
determining, based at least in part on the wireless fingerprint, a distance of the location within the subject area at which the mobile communication device is or was positioned from the at least one transmitter from which the at least one signal was received by the mobile communication device,
relating the distance of the location from the at least one transmitter with the at least one signal strength value of the at least one signal received by the mobile communication device from the at least one transmitter; and
generating an area wireless signal distribution map for the subject area, wherein the area wireless signal distribution map associates the location with the at least one signal strength value, wherein the location is defined with respect to the distance from the at least one transmitter.

9. The system of claim 8, wherein the wireless fingerprint further comprises an identification of the at least one transmitter associated with the subject area.

10. The system of claim 8, wherein the at least one signal strength value of the at least one signal is at or above a threshold, as determined by the mobile communication device.

11. The system of claim 8, wherein the wireless fingerprint further comprises an identification of the mobile communication device from which the wireless fingerprint is received, an identification of the at least one transmitter associated with the subject area, and a time stamp comprising the specific time.

12. The system of claim 11, wherein the time stamp corresponds to at least one of when the at least one signal was transmitted by the at least one transmitter to the mobile communication device, when the at least one signal was received by the mobile communication device, or when the at least one signal strength value of the at least one signal was measured by the mobile communication device.

13. The system of claim 8, wherein receiving the wireless fingerprint generated by the mobile communication device comprises receiving a plurality of wireless fingerprints from the mobile communication device, wherein the plurality of wireless fingerprints include the wireless fingerprint, wherein the plurality of wireless fingerprints comprise signal strength values of signals received by the mobile communication device from the at least one transmitter, wherein each of the plurality of wireless fingerprints corresponds to a respective location within the subject area at which the mobile communication device is or was positioned at a corresponding specific time, wherein the plurality of wireless fingerprints indicate a movement characteristic of the mobile communication device with respect to the at least one transmitter such that the mobile communication device is determined to be moving towards the at least one transmitter when the signal strength values of the signals from the at least one transmitter increase over a period of time, and wherein the signal strength values of the signals comprise the at least one signal strength value of the at least one signal of the wireless fingerprint.

14. The system of claim 8, wherein receiving the wireless fingerprint generated by the mobile communication device comprises receiving a plurality of wireless fingerprints from the mobile communication device, wherein the plurality of wireless fingerprints include the wireless fingerprint, wherein the plurality of wireless fingerprints comprise signal strength values of signals received by the mobile communication device from the at least one transmitter, wherein each of the plurality of wireless fingerprints corresponds to a respective location within the subject area at which the mobile communication device is or was positioned at a corresponding specific time, wherein the plurality of wireless fingerprints indicate a movement characteristic of the mobile communication device with respect to the at least one transmitter such that the mobile communication device is determined to be moving away from the at least one transmitter when the signal strength values of the signals from the at least one transmitter decrease over a period of time, and wherein the signal strength values of the signals comprise the at least one signal strength value of the at least one signal of the wireless fingerprint.

15. A computer-readable storage device comprising computer-executable instructions that, when executed by a processor of a system, cause the processor to perform operations comprising:
receiving, from a mobile communication device, a wireless fingerprint generated by the mobile communication device, the wireless fingerprint corresponding to a location within a subject area at which the mobile communication device is or was positioned at a specific time, and the wireless fingerprint comprising at least one signal strength value of at least one signal received by the mobile communication device from at least one transmitter associated with the subject area, wherein the at least one signal strength value of the at least one signal is measured by the mobile communication device;
determining, based at least in part on the wireless fingerprint, a distance of the location within the subject area at which the mobile communication device is or was positioned from the at least one transmitter from which the at least one signal was received by the mobile communication device;
relating the distance of the location from the at least one transmitter with the at least one signal strength value of the at least one signal received by the mobile communication device from the at least one transmitter; and
generating an area wireless signal distribution map for the subject area, wherein the area wireless signal distribution map associates the location with the at least one signal strength value, wherein the location is defined with respect to the distance from the at least one transmitter.

16. The computer-readable storage device of claim 15, wherein the wireless fingerprint further comprises an identification of the at least one transmitter associated with the subject area.

17. The computer-readable storage device of claim 15, wherein the at least one signal strength value of the at least one signal is at or above a threshold, as determined by the mobile communication device.

18. The computer-readable storage device of claim 15, wherein the wireless fingerprint further comprises an identification of the mobile communication device from which the wireless fingerprint is received, an identification of the at least one transmitter associated with the subject area, and a time stamp comprising the specific time.

19. The computer-readable storage device of claim 18, wherein the time stamp corresponds to at least one of when the at least one signal was transmitted by the at least one transmitter to the mobile communication device, when the at least one signal was received by the mobile communication device, or when the at least one signal strength value of the at least one signal was measured by the mobile communication device.

20. The computer-readable storage device of claim 15, wherein receiving the wireless fingerprint generated by the mobile communication device comprises receiving a plurality of wireless fingerprints from the mobile communication device, wherein the plurality of wireless fingerprints include the wireless fingerprint, wherein the plurality of wireless fingerprints comprise signal strength values of signals received by the mobile communication device from the at least one transmitter, wherein each of the plurality of wireless fingerprints corresponds to a respective location within the subject area at which the mobile communication device is or was positioned at a corresponding specific time, wherein the plurality of wireless fingerprints indicate a movement characteristic of the mobile communication device with respect to the at least one transmitter such that the mobile communication device is determined to be moving towards the at least one transmitter when the signal strength values of the signals from the at least one transmitter increase over a first period of time and that the mobile communication device is determined to be moving away from the at least one transmitter when the signal strength values of the signals from the at least one transmitter decrease over a second period of time, wherein the signal strength values of the signals comprise the at least one signal strength value of the at least one signal of the wireless fingerprint.

* * * * *